US012438605B2

(12) United States Patent
Wang et al.

(10) Patent No.: US 12,438,605 B2
(45) Date of Patent: Oct. 7, 2025

(54) SATELLITE COMMUNICATION SYSTEM HAVING INTERCONNECTED CONSTELLATION AND METHOD FOR OPERATING SATELLITE COMMUNICATION SYSTEM

(71) Applicant: TRON FUTURE TECH INC., Hsinchu (TW)

(72) Inventors: Yu-Jiu Wang, Hsinchu (TW); Bor-Ching Su, Hsinchu (TW); Chang-Heng Wang, Hsinchu (TW)

(73) Assignee: TRON FUTURE TECH INC., Hsinchu (TW)

( * ) Notice: Subject to any disclaimer, the term of this patent is extended or adjusted under 35 U.S.C. 154(b) by 202 days.

(21) Appl. No.: 18/312,401

(22) Filed: May 4, 2023

(65) Prior Publication Data

US 2023/0361862 A1  Nov. 9, 2023

Related U.S. Application Data

(60) Provisional application No. 63/339,524, filed on May 9, 2022, provisional application No. 63/339,392, filed on May 6, 2022.

(51) Int. Cl.
*H04W 40/12* (2009.01)
*H04B 7/185* (2006.01)

(52) U.S. Cl.
CPC ..... *H04B 7/18521* (2013.01); *H04B 7/18519* (2013.01); *H04W 40/12* (2013.01)

(58) Field of Classification Search
None
See application file for complete search history.

(56) References Cited

U.S. PATENT DOCUMENTS

2020/0343968 A1* 10/2020 Liu ..................... H04W 40/248
2023/0370154 A1* 11/2023 Ciochina ........... H04W 74/0833

FOREIGN PATENT DOCUMENTS

EP  1764933 A1  3/2007

OTHER PUBLICATIONS

Liao Z, Chen C, Ju Y, He C, Jiang J, Pei Q. Multi-Controller Deployment in SDN-Enabled 6G Space—Air-Ground Integrated Network. Remote Sensing. 2022; 14(5):1076. https://doi.org/10.3390/rs14051076 (Year: 2022).*

(Continued)

*Primary Examiner* — Jae Y Lee
*Assistant Examiner* — Nam P. Cao
(74) *Attorney, Agent, or Firm* — WPAT, P.C.; Anthony King

(57) ABSTRACT

A method for operating a satellite communication system includes: interconnecting a first controller of a first satellite constellation and a second controller of a second satellite constellation in the satellite communication system to form an interconnected constellation, wherein the second satellite constellation is different from the first satellite constellation, and the interconnected constellation comprises the first satellite constellation and the second satellite constellation; utilizing the first controller to obtain first control information on the first satellite constellation, and receive second control information on the second satellite constellation from the second controller; and performing data communication via the interconnected constellation according to the first control information and the second control information.

17 Claims, 20 Drawing Sheets

(56) References Cited

OTHER PUBLICATIONS

Office action of a Taiwan counterpart application 112116585 issued by the TIPO on Jun. 28, 2024.
English translation of the office action of a Taiwan counterpart application 112116585 issued by the TIPO on Jun. 28, 2024.
Liao, Z., Chen, C., Ju, Y., He, C., Jiang, J., & Pei, Q. (2022). Multi-controller deployment in SDN-enabled 6G space—air-ground integrated network. Remote Sensing, 14(5), 1076.
Li, X., Tang, F., Fu, L., Yu, J., Chen, L., Liu, J., . . . & Yang, L. T. (2022). Optimized controller provisioning in software-defined LEO satellite networks. IEEE Transactions on Mobile Computing.
Search report of a EP counterpart application 23171536.8 issued by the EPO on Oct. 4, 2023.
Bertaux, L., Medjiah, S., Berthou, P., Abdellatif, S., Hakiri, A., Gelard, P., . . . & Bruyere, M. (2015). Software defined networking and virtualization for broadband satellite networks. IEEE Communications Magazine, 53(3), 54-60.
Papa, A., De Cola, T., Vizarreta, P., He, M., Machuca, C. M., & Kellerer, W. (Dec. 2018). Dynamic SDN controller placement in a LEO constellation satellite network. In 2018 IEEE Global Communications Conference (GLOBECOM) (pp. 206-212). IEEE.

\* cited by examiner

SATELLITE COMMUNICATION SYSTEM HAVING INTERCONNECTED CONSTELLATION AND METHOD FOR OPERATING SATELLITE COMMUNICATION SYSTEM

PRIORITY CLAIM AND CROSS-REFERENCE

The present application claims priority to U.S. Provisional Patent Applications including Ser. No. 63/339,392, filed on May 6, 2022, and Ser. No. 63/339,524, filed on May 9, 2022, each of which is incorporated by reference herein in its entirety.

BACKGROUND

The present disclosure relates to satellite communication and, more particularly, to a satellite communication system having an interconnected constellation, and a method for operating a satellite communication system.

Satellite communications utilize satellites in orbit around the Earth to transport information from one place to another on the earth. The satellites can cover wide geographic regions, and link remote areas of the Earth with wireless networks. For example, a satellite may receive a signal that is sent from a station on the earth over an uplink, i.e. a link from the station up to the satellite. The satellite can convert and amplify the signal with the use of transponders, and the resulting signal can be sent to one or more receivers over a downlink, i.e. a link from the satellite down to the one or more receivers. As satellites can provide various communication services, satellite communications can support a large number of applications and have a significant impact on our daily lives.

SUMMARY

The described embodiments provide a satellite communication system having an interconnected constellation, and a method for operating a satellite communication system.

Some embodiments described herein may include a method for operating a satellite communication system. The method includes: interconnecting a first controller of a first satellite constellation and a second controller of a second satellite constellation in the satellite communication system to form an interconnected constellation, wherein the second satellite constellation is different from the first satellite constellation, and the interconnected constellation comprises the first satellite constellation and the second satellite constellation; utilizing the first controller to obtain first control information on the first satellite constellation, and receive second control information on the second satellite constellation from the second controller; and performing data communication via the interconnected constellation according to the first control information and the second control information.

Some embodiments described herein may include a controller for operating a satellite communication system. The controller includes one or more processors and a storage device. The storage device stores instructions that, when executed by the one or more processors, cause the one or more processors to: obtain first control information on a first satellite constellation in the satellite communication system; establish a communication link between the controller and another controller of a second satellite constellation in the satellite communication system, wherein the first satellite constellation and the second satellite constellation utilize different medium access control protocols; receive second control information on the second satellite constellation from the another controller via the communication link; and perform data communication according to the first control information and the second control information.

With the use of the proposed satellite communication scheme, different satellite constellations can work in collaboration to extend a coverage area and provide a robust link within the coverage area. In addition, the proposed satellite communication scheme can reduce network latency between a user terminal and a gateway that is distant from the user terminal. Further, the proposed satellite communication scheme can enable a resilient satellite network to optimize scheduling and routing for the overall network traffic.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
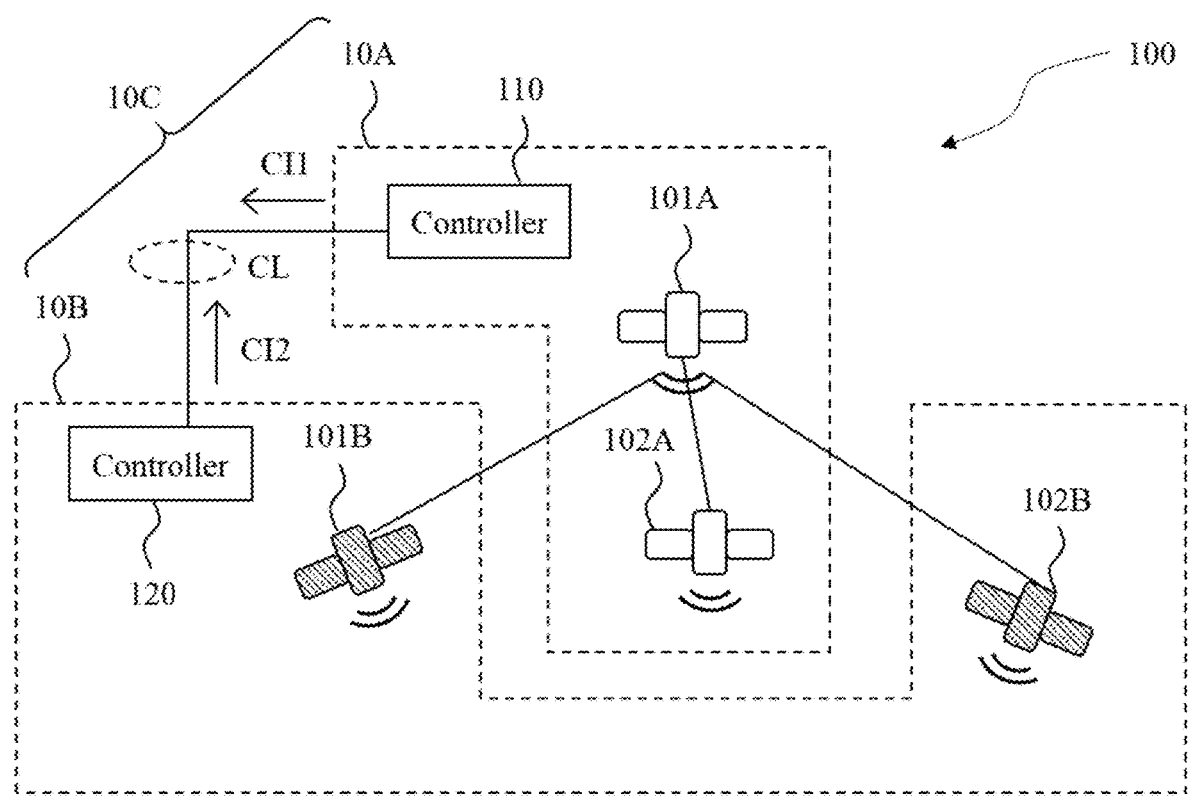
FIG. 1A is a diagram illustrating an exemplary satellite communication system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

A group of satellites can be distributed among orbital planes and work as a system to form a satellite constellation. For example, satellites can be deployed in low Earth orbit (LEO) to form a LEO satellite constellation, which may provide high-throughput and broadband service with low latency. However, a satellite constellation would need a large number of satellites to achieve continuous coverage over an area, resulting in complicated computational complexity of routing.

The present disclosure describes exemplary methods for operating a satellite communication system including more than one satellite constellation. The exemplary method can construct an interconnected constellation by soft combining satellite constellations or interconnecting respective controllers of the satellite constellations. The exemplary method can enable the satellite constellations to work in collaboration, thereby extending a coverage area and realizing a resilient satellite network. In some embodiments, the satellite constellations may belong to different operators or utilize different communication protocols.

The present disclosure further describes exemplary satellite communication systems, each of which includes an interconnected constellation implemented using a plurality of satellite constellations. The satellite constellations can be soft combined or interconnected through controllers thereof, thereby forming the interconnected constellation. The controllers can jointly schedule data communication in the satellite communication system. In some embodiments, each satellite constellation can be implemented as a software-defined constellation which employs software-defined networking (SDN) architecture. Further description is provided below.

FIG. 1A is a diagram illustrating an exemplary satellite communication system in accordance with some embodiments of the present disclosure. The satellite communication system 100 may include a plurality of satellite constellations 10A and 10B different from each other. For example, the satellite constellations 10A and 10B may belong to different constellation operators. As another example, the satellite constellations 10A and 10B may utilize different communication protocols or medium access control (MAC) protocols. Note that the number of satellites in the satellite constellation 10A/10B is provided for illustrative purposes. The satellite constellation 10A/10B may include more than two satellites without departing from the scope of the present disclosure.

The flow of data in the satellite constellation 10A can be managed by the controller 110. By way of example but not limitation, the satellite constellation 10A can be a software-defined constellation implemented using SDN architecture that includes a control layer, an application layer and an infrastructure layer. The controller 110 can be included in the control layer, and configured to link the application layer and the infrastructure layer. Programs on the application layer may transmit network instructions to the controller 110. Network elements of the satellite constellation 10A, such as modem modules of satellites/gateways (not shown) or intersatellite link modules (not shown), are included in the infrastructure layer.

Note that the controller 110 may be implemented as a centralized controller or a distributed controller. For example, the controller 110 may be a centralized controller located in a gateway (not shown) or located in a satellite 101A/102A of the satellite constellation 10A. The controller 110 can be responsible for controlling each of the network devices (not shown) of the satellite constellation 10A, such as switches or gateways. As another example, the controller 110 may be a distributed controller located in a gateway (not shown) or located in the satellite 101A/102A. The controller 110 can be responsible for controlling a part of the network devices of the satellite constellation 10A.

Similarly, the flow of data in the satellite constellation 10B can be managed by the controller 120. The satellite constellation 10B, including satellites 101B and 102B, may be a software-defined constellation implemented using SDN architecture. The controller 120 may be included in the control layer of the SDN architecture. In some examples, the controller 120 may be implemented as a centralized controller or a distributed controller.

The satellite constellations 10A and 10B can be soft combined or interconnected with the use of their respective controllers 110 and 120, thereby forming an interconnected constellation 10C. For example, the controller 110 can be configured to generate the control information CI1 on the satellite constellation 10A, and the controller 120 can be configured to generate the control information CI2 on the satellite constellation 10B. The control information CI1 and the control information CI2 can be shared among the controllers 110 and 120 via a communication link CL. The controllers 110 and 120 can work in collaboration to form the interconnected constellation 10C which includes the satellite constellations 10A and 10B. In addition, the controllers 110 and 120 can jointly schedule the overall data flow in the interconnected constellation 10C according to the control information CI1 and the control information CI2.

Figure 1B:
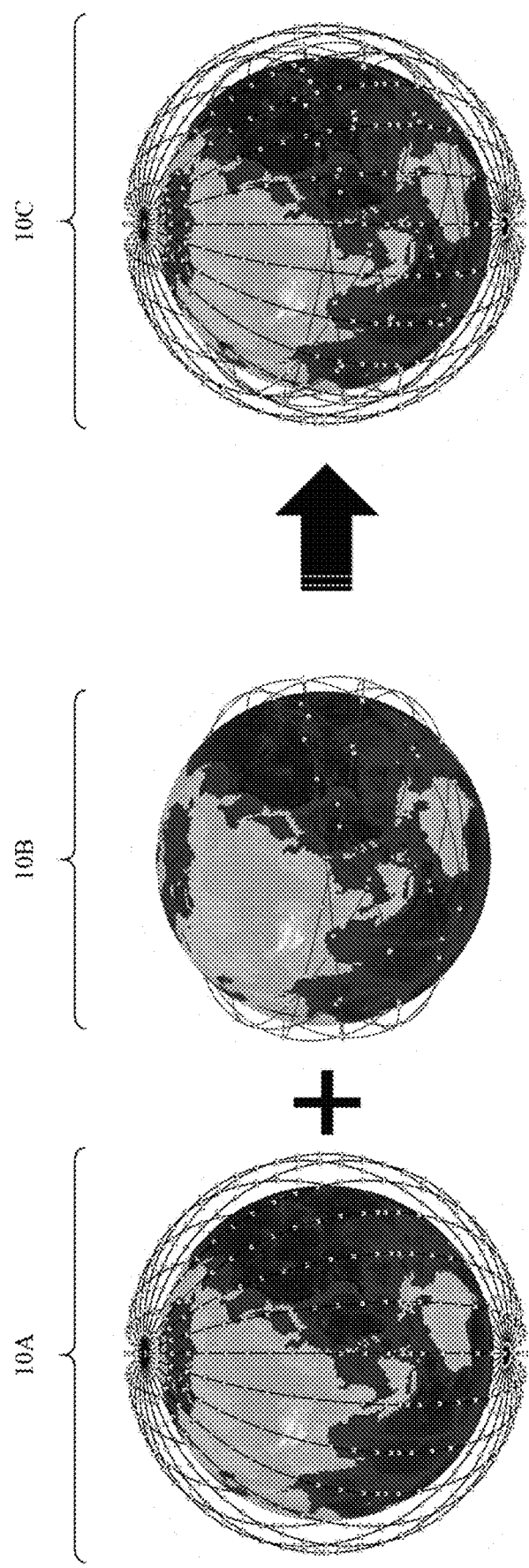
FIG. 1B illustrates an implementation of the collaboration between the different satellite constellations shown in FIG. 1A in accordance with some embodiments of the present disclosure.

Referring to FIG. 1B, an implementation of the collaboration between the different satellite constellations 10A and 10B shown in FIG. 1A is illustrated in accordance with some embodiments of the present disclosure. In the example of FIG. 1B, the satellite constellation 10A may include a first group of satellites placed in sets of orbital planes above Earth's surface, and the satellite constellation 10B may include a second group of satellites placed in sets of orbital planes above Earth's surface. By soft combining the satellite constellations 10A and 10B, or interconnecting respective controllers of the satellite constellations 10A and 10B, the satellite communication system 100 can enable the satellite constellations 10A and 10B to work in collaboration to form the interconnected constellation 10C. The interconnected constellation 10C can achieve continuous global coverage with the use of the first and second groups of satellites, and implement a resilient satellite network to optimize scheduling and routing for the overall network traffic.

Figure 2:
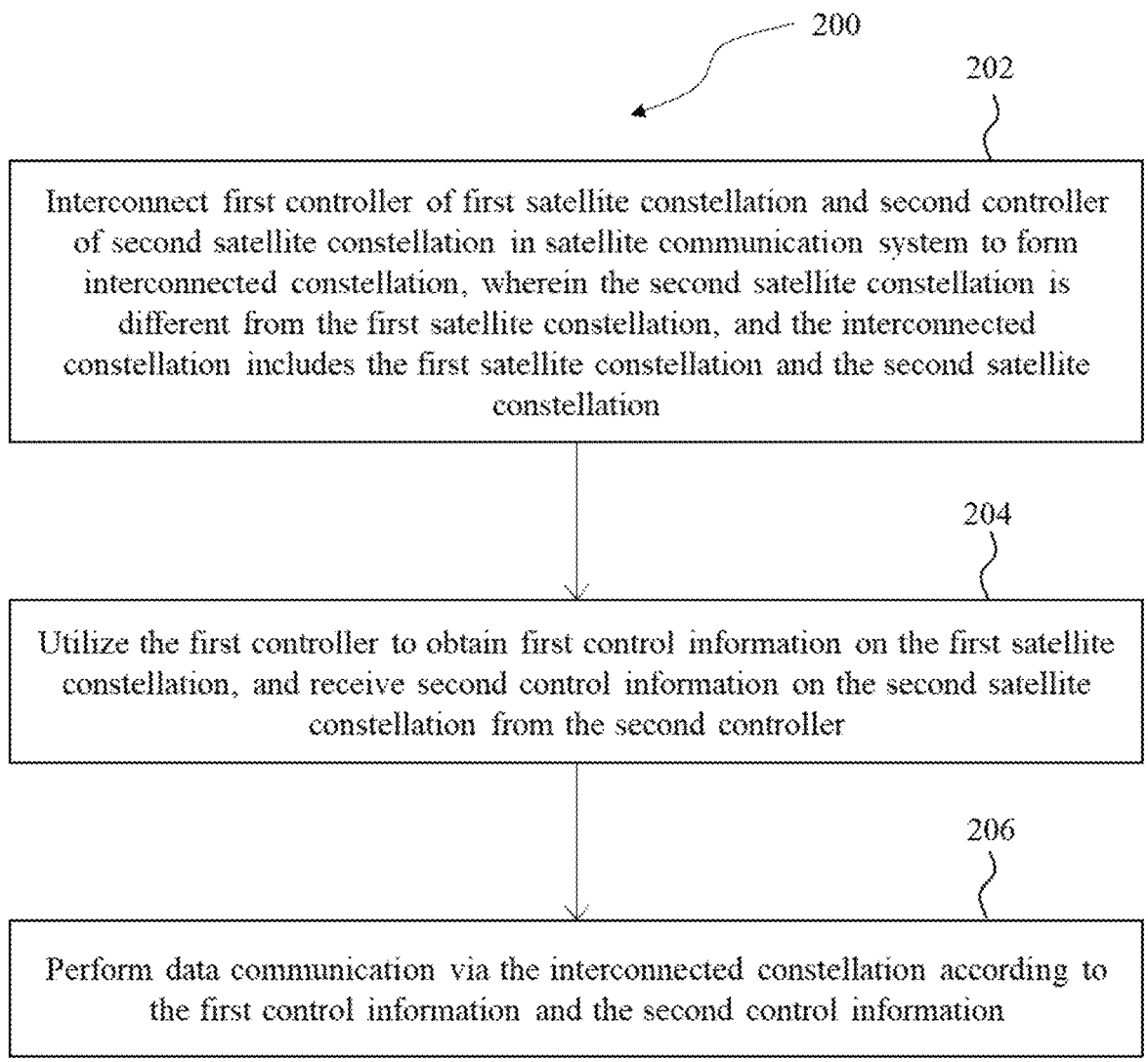
FIG. 2 is a flow chart of an exemplary method for operating a satellite communication system in accordance with some embodiments of the present disclosure.

FIG. 2 is a flow chart of an exemplary method for operating a satellite communication system in accordance with some embodiments of the present disclosure. For illustrative purposes, the method 200 is described below with reference to the satellite communication system 100 shown in FIG. 1A. Note that the method 200 can be applied to other satellite communication systems, each including different satellite constellations, without departing from the scope of the present disclosure. Additionally, in some embodiments, other operations in the method 200 can be performed. In some other embodiments, operations of the method 200 can be performed in a different order and/or vary.

Referring to FIG. 2 and also to FIG. 1A, at operation 202, a first controller of a first satellite constellation and a second controller of a second satellite constellation are interconnected to form an interconnected constellation, which includes the first satellite constellation and the second satellite constellation. For example, by interconnecting the controllers 110 and 120 via the communication link CL, different satellite constellations 101 and 102 can be combined to form the interconnected constellation 10C.

In some embodiments, the first satellite constellation and the second satellite constellation may belong to different constellation operators, and/or utilize different communication protocols. For example, the satellite constellation 10A may utilize an MAC protocol for satellite communication, while the satellite constellation 10B may utilize another MAC protocol for satellite communication. At least one of the controllers 110 and 120 is capable of performing protocol conversion, and can be configured to translate communication protocols between the satellite constellations 10A and 10B.

At operation 204, the first controller is utilized to obtain first control information on the first satellite constellation, and to receive second control information on the second satellite constellation from the second controller. For example, the controller 110 may store the control information CI1, and receive the control information CI2 from the controller 120. As another example, the controller 120 may store the control information CI2, and receive the control information CI1 from the controller 110. As still another example, each of the controllers 110 and 120 may share its control information with other controller(s) via the communication link CL. Thus, each controller may receive control information from another controller via the communication link CL.

In some embodiments, the control information CI1 may include characteristic data associated with each satellite of the satellite constellation 10A. The characteristic data may be indicative of a satellite link quality, a location, a traffic load, and/or other types of information associated with the satellite. Similarly, in some embodiments, the control information CI2 may include characteristic data associated with each satellite of the satellite constellation 10B. The characteristic data may be indicative of a satellite link quality, a location, a traffic load, and/or other types of information associated with the satellite.

At operation 206, data communication is performed via the interconnected constellation according to the first control information and the second control information. For example, the controller 110/120 can perform data communication via the interconnected constellation 10C according to the control information CI1 and the control information CI2. As another example, the controllers 110 and 120 can coordinate with each other according to the control information CI1 and the control information CI2, thereby jointly scheduling the overall data flow in the interconnected constellation 10C.

With the use of the proposed satellite communication scheme, different satellite constellations can work in collaboration to extend a coverage area. In addition, the proposed satellite communication scheme can enable a resilient satellite network to optimize scheduling and routing for the overall network traffic. For example, the controllers 110 and 120 can jointly determine a data transmission path of a data traffic flow in the satellite communication system 100, in which the data transmission path may include at least one satellite of the satellite constellation 10A and at least one satellite of the satellite constellation 10B. Routing data packets via the data transmission path can effectively balance the overall traffic load and improve bandwidth utilization of the satellite communication system 100.

To facilitate understanding of the present disclosure, some embodiments are given as follows for further description of the proposed satellite communication scheme. In the embodiments shown in FIG. 3 to FIG. 9, the proposed satellite communication scheme can perform data communication via an interconnected constellation without the use of an intersatellite link. In the embodiments shown in FIG. 10 to FIG. 18, the proposed satellite communication scheme can perform data communication via an intersatellite link established between satellites of different satellite constellations. However, these embodiments are not intended to be limiting. Those skilled in the art should appreciate that other embodiments employing the method 200 shown in FIG. 2 are also within the contemplated scope of the present disclosure.

Figure 3:
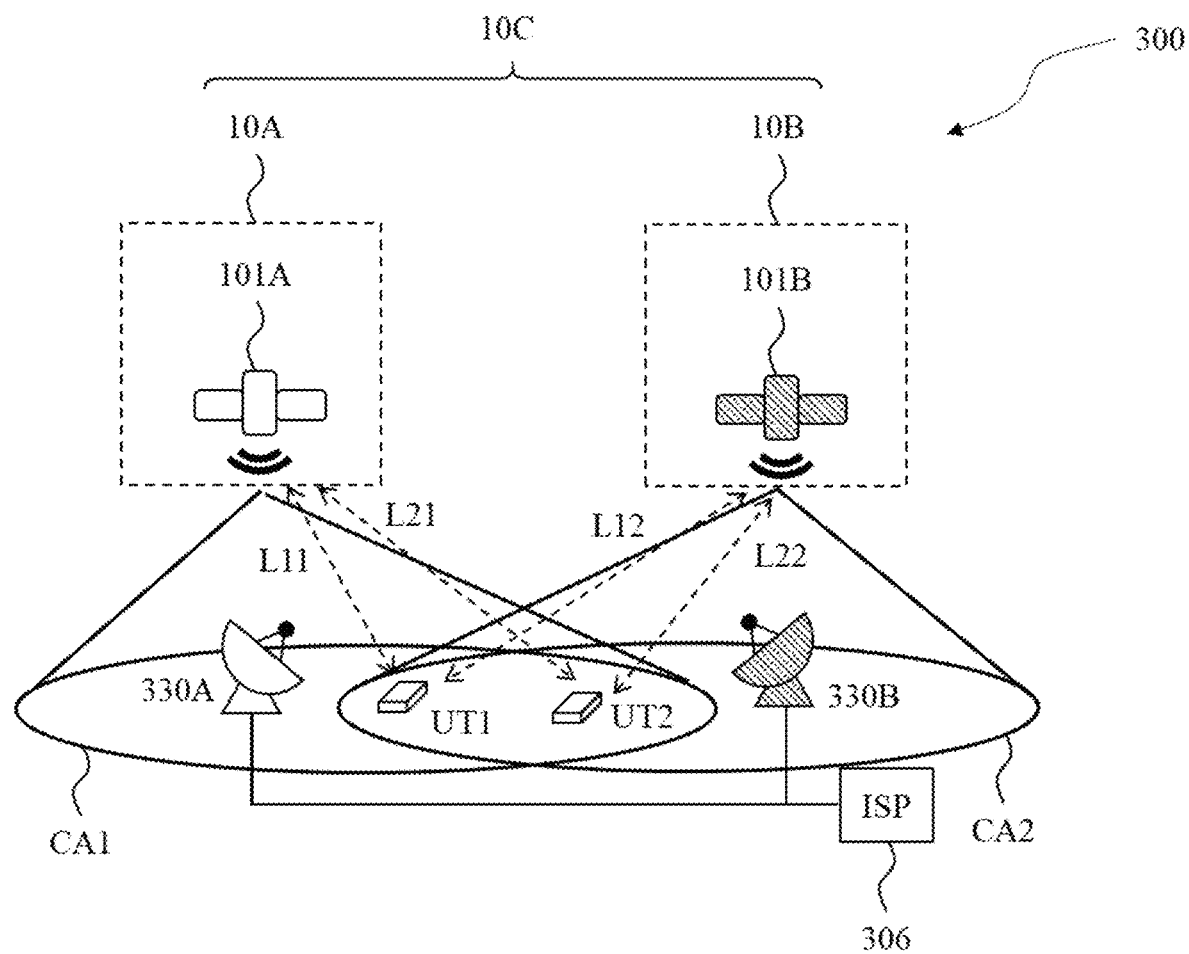
FIG. 3 illustrates an implementation of the satellite communication system shown in FIG. 1A in accordance with some embodiments of the present disclosure.

Referring firstly to FIG. 3, the satellite communication system 300 can employ the method 200 shown in FIG. 2 to extend a coverage area, and provide a robust satellite link within the coverage area for the user terminal UT1/UT2. The satellite communication system 300 can serve as an embodiment of the satellite communication system 100 shown in FIG. 1A. The satellite communication system 300 may include the satellite constellations 10A and 10B shown in FIG. 1A, and a plurality of gateways 330A and 330B separated from each other. Each of the gateways 330A and 330B can be configured to route traffic from a communication network, such as the Internet, a terrestrial network, a public network or a private network, across a satellite link to the user terminal UT1/UT2. For example, each of the user terminals UT1 and UT2 can support the satellite constellations 10A and 10B. The gateways 330A and 330B may be in communication with at least one Internet service provider (ISP) 306. Each of the user terminals UT1 and UT2 may access the Internet via the gateway 330A or the gateway 330B.

In the present embodiment, the gateway 330A is connected to the satellite constellation 10A, and arranged to provide communication links using satellites of the satellite constellation 10A. When the user terminal UT1/UT2 is located in a coverage area CA1 of the satellite constellation 10A, the gateway 330A may allow the user terminal UT1/UT2 to access the Internet via the satellite 101A. Similarly, the gateway 330B is connected to the satellite constellation 10B, and arranged to provide communication links using satellites of the satellite constellation 10B. When the user terminal UT1/UT2 is located in a coverage area CA2 of the satellite constellation 10B, the gateway 330B may allow the user terminal UT1/UT2 to access the Internet via the satellite 101B.

Note that when a user terminal is located in an overlapping coverage area of the satellite constellations 10A and 10B, one of the satellites 101A and 101B can be selected for data communication according to satellite link quality information on the satellite constellations 10A and 10B.

Figure 4:
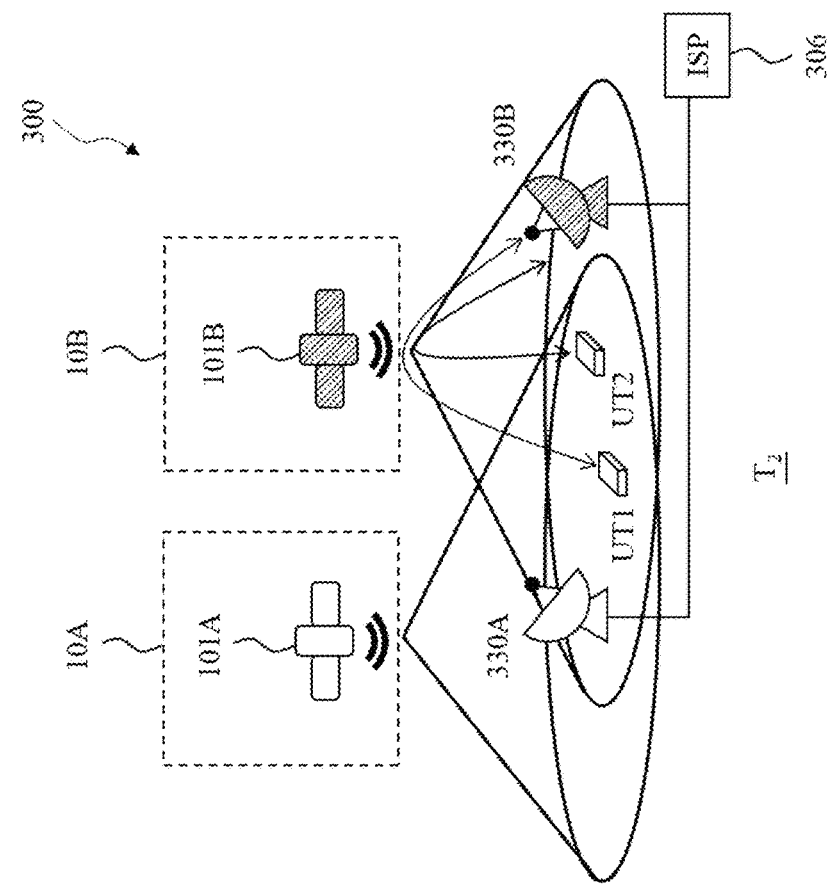
FIG. 4 illustrates an implementation of a network topology of the satellite communication system shown in FIG. 3 at different times in accordance with some embodiments of the present disclosure.
Figure 4:
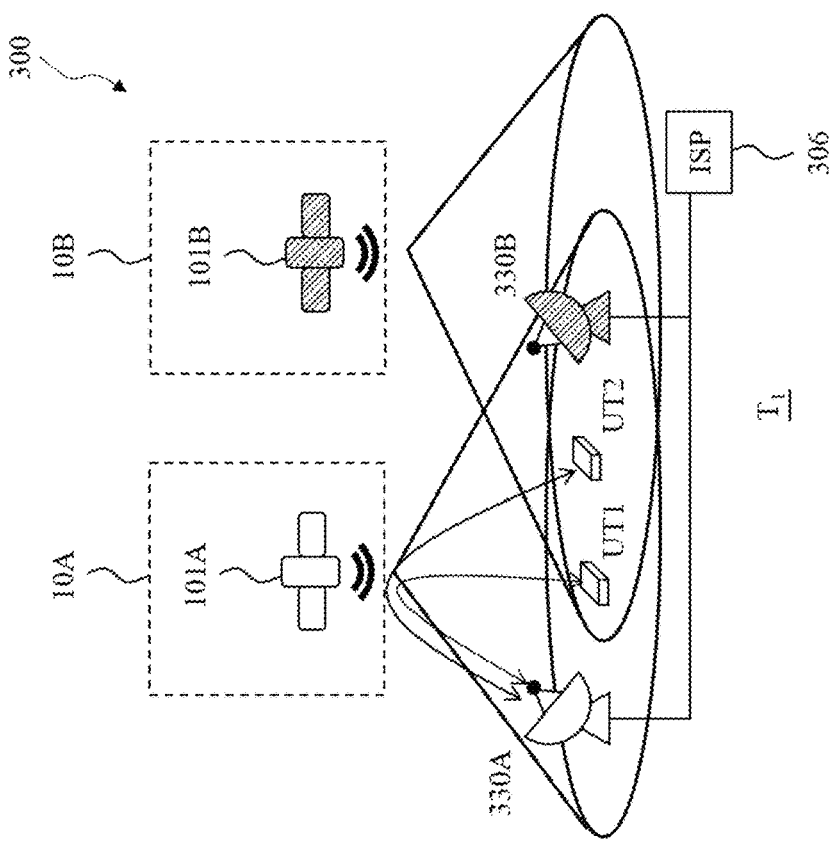

For example, referring to FIG. 4 and also to FIG. 3, the satellite 101A is located closer to the user terminal UT1 than the satellite 101B at time $T_1$. The communication link L11, established between the user terminal UT1 and the satellite 101A, may have a higher link quality than the communication link L12, established between the user terminal UT1 and the satellite 101B. The satellite 101A may be selected for data communication, and the user terminal UT1 can access the Internet via the satellite 101A and the gateway 330A. Similarly, the satellite 101A is located closer to the user terminal UT2 than the satellite 101B at time $T_1$. The communication link L21, established between the user terminal UT2 and the satellite 101A, may have a higher link quality than the communication link L22, established between the user terminal UT2 and the satellite 101B. The satellite 101A may be selected for data communication, and the user terminal UT2 can access the Internet via the satellite 101A and the gateway 330A.

At time $T_2$, the satellite 101B is located closer to the user terminal UT1 than the satellite 101A. The communication link L12 may have a higher link quality than the communication link L11. In addition, the satellite 101B is located closer to the user terminal UT2 than the satellite 101A. The communication link L22 may have a higher link quality than the communication link L21. Thus, the satellite 101B may be selected for data communication, and the user terminal UT1/UT2 can access the Internet via the satellite 101B and the gateway 330B.

Figure 5:
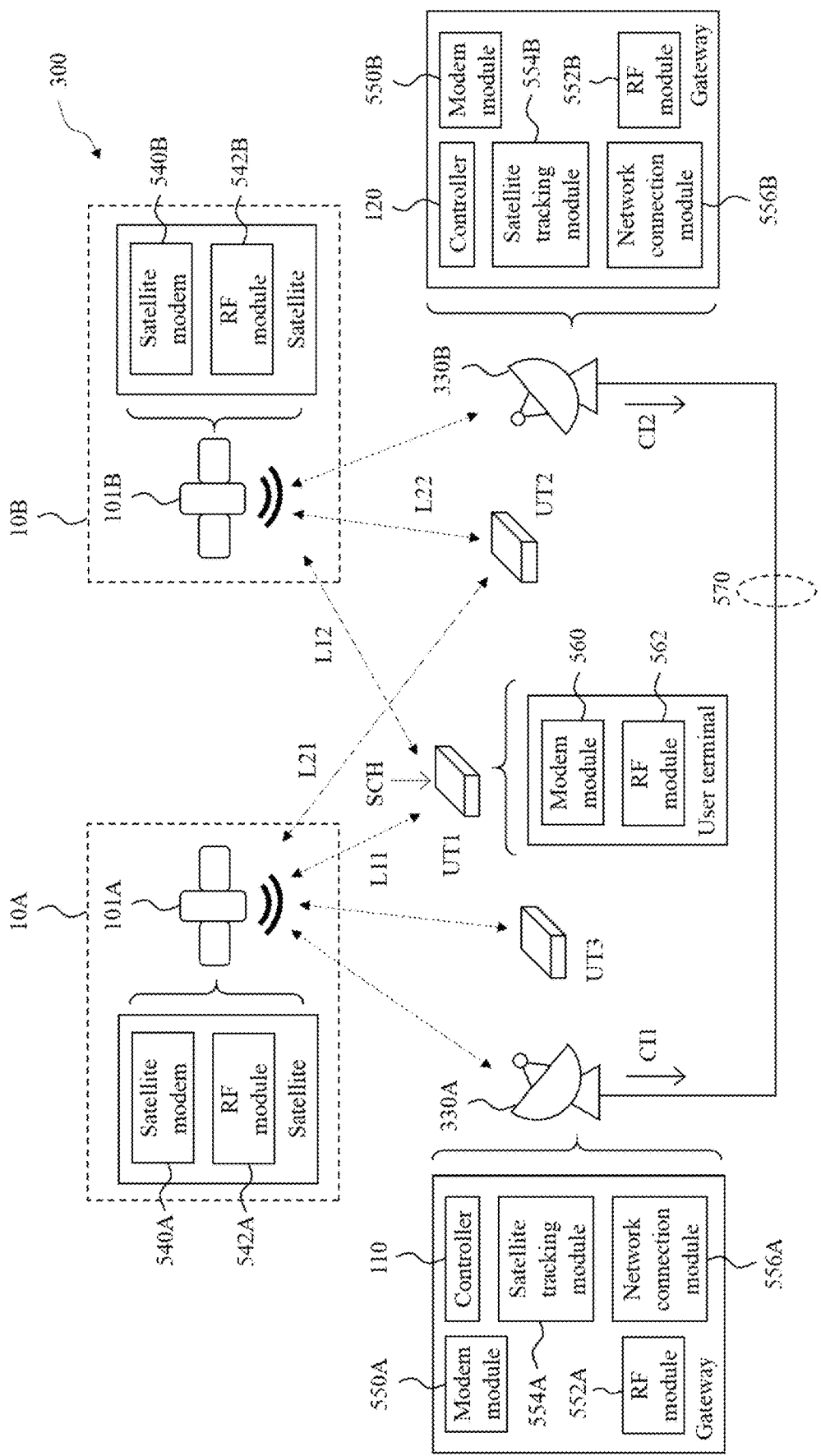
FIG. 5 illustrates an implementation of the satellite communication system shown in FIG. 3 in accordance with some embodiments of the present disclosure.

FIG. 5 illustrates an implementation of the satellite communication system 300 shown in FIG. 3 in accordance with some embodiments of the present disclosure. In the present embodiment, the satellite 101A may include, but is not limited to, a satellite modem 540A and a radio frequency (RF) module 542A. The satellite modem 540A can be configured to modulate/demodulate signals that are transmitted/received using a satellite of the satellite constellation 10A, i.e. the satellite 101A. The RF module 542A includes an antenna that can be arranged for transmitting/receiving RF signals. Similarly, the satellite 101B may include, but is not limited to, a satellite modem 540B and an RF module 542B. The satellite modem 540B can be configured to modulate/demodulate signals that are transmitted/received using a satellite of the satellite constellation 10B, i.e. the satellite 101B. The RF module 542B includes an antenna that can be arranged for transmitting/receiving RF signals.

The gateway 330A may include, but is not limited to, the controller 110 shown in FIG. 1A, a modem module 550A, an RF module 552A, a satellite tracking module 554A and a network connection module 556A. The modem module 550A can be arranged for signal modulation/demodulation. The RF module 552A includes an antenna that can be arranged for transmitting/receiving RF signals. The satellite tracking module 554A can be configured to track each satellite of the satellite constellation 10A. The network connection module 556A can be configured to establish and terminate a network connection, such as an Internet connection. In the example of FIG. 5, the controller 110 can be configured to control operation of the modem module 550A, the RF module 552A, the satellite tracking module 554A and the network connection module 556A, thereby managing flow of data in the satellite constellation 10A.

The gateway 330B may include, but is not limited to, the controller 120 shown in FIG. 1A, a modem module 550B, an RF module 552B, a satellite tracking module 554B and a network connection module 556B. The modem module 550B can be arranged for signal modulation/demodulation. The RF module 552B includes an antenna that can be arranged for transmitting/receiving RF signals. The satellite tracking module 554B can be configured to track each satellite of the satellite constellation 10B. The network connection module 556B can be configured to establish and terminate a network connection, such as an Internet connection. In the example of FIG. 5, the controller 120 can be configured to control operation of the modem module 550B, the RF module 552B, the satellite tracking module 554B and the network connection module 556B, thereby managing flow of data in the satellite constellation 10B.

In addition, each of the user terminals UT1-UT3 may include a modem module and an RF module. The modem module can be configured to support both the satellite constellations 10A and 10B. For example, the user terminal UT1 includes a modem module 560 and an RF module 562. The modem module 560 can be configured to modulate/demodulate signals which are transmitted/received via the communication link L11/L12 established between the user terminal UT1 and the satellite 101A/101B. The RF module 562 may include an antenna that can be arranged for transmitting/receiving RF signals.

In operation, the controller 110 can generate the control information CI1 indicative of a link quality of the communication link L11, and the controller 120 can generate the control information CI2 indicative of a link quality of the communication link L12. The gateways 330A and 330B can establish a communication link 570 therebetween. The controller 120 may share the control information CI2 with the controller 110 via the communication link 570. The controller 110 can select, at least according to the link quality of the communication link L11 and the link quality of the communication link L12, one from the satellites 101A and 101B as a candidate satellite for data transmission between the user terminal UT1 and a gateway. For example, when the link quality of the communication link L11 is higher than the link quality of the communication link L12, the controller 110 can select the satellite 101A as the candidate satellite; when the link quality of the communication link L12 is higher than the link quality of the communication link L11, the controller 110 can select the satellite 101B as the candidate satellite.

Alternatively, the controller 110 may share the control information CI1 with the controller 120 via the communication link 570. The controller 120 can select, at least according to the link quality of the communication link L11 and the link quality of the communication link L12, one from the satellites 101A and 101B as a candidate satellite for data transmission between the user terminal UT1 and a gateway.

Note that the proposed satellite communication scheme can allow a controller of a satellite constellation to select a satellite of another satellite constellation for data communication, thus providing an extended coverage area and a robust satellite link for each user terminal. In addition, the proposed satellite communication scheme can use a satellite link of a higher link quality for data communication, thus improving network resource utilization of a satellite communication system.

Figure 6:
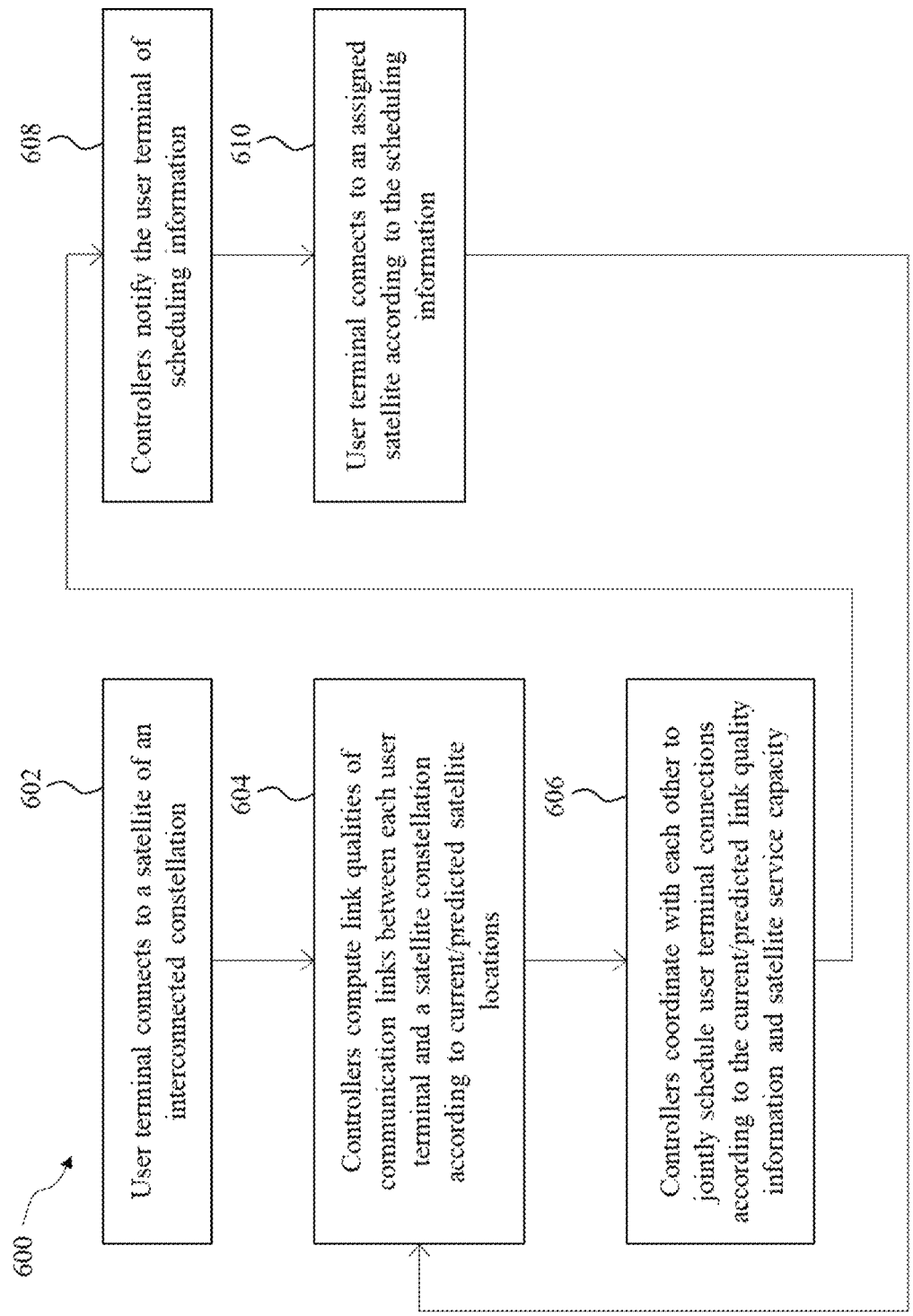
FIG. 6 is a flow chart of an exemplary method for operating a satellite communication system in accordance with some embodiments of the present disclosure.

FIG. 6 is a flow chart of an exemplary method for operating a satellite communication system in accordance with some embodiments of the present disclosure. The method 600 can serve as an implementation of the method 200 show in FIG. 2. The satellite communication system 300 shown in FIG. 3, FIG. 4 or FIG. 5 can employ the method 600 to provide an extended coverage area and a robust satellite link for each user terminal. For illustrative purposes, the method 600 is described below with reference to the satellite communication system 300 shown in FIG. 5. Those skilled in the art can appreciate that the method 600 can be applied to the satellite communication system 100 shown in FIG. 1A or other implementations of the satellite communication system 300 shown in FIG. 3 without departing from the scope of the present disclosure.

Referring to FIG. 6 and also to FIG. 5, at operation 602, a user terminal may connect to a satellite of an interconnected constellation. For example, the user terminal UT1 can support both the satellite constellations 10A and 10B. When the user terminal UT1 is located in an overlapping coverage area of the satellites 101A and 101B, the user terminal UT1 can connect to the satellite 101A via the communication link L11, or connect to the satellite 101B via the communication link L12.

At operation 604, each controller can obtain information on a link quality of a communication link between the user terminal and each satellite constellation. For example, the controller 110 can compute a link quality of a communication link between each user terminal and a satellite constellation, and accordingly generate the control information CI1 indicative of a link quality of the communication link L11. The control information CI1 may further indicate a link quality of a communication link between the user terminal UT1/UT3 and the satellite 101A. Similarly, the controller 120 can generate the control information CI2, which can indicate a link quality of a communication link between the user terminal UT1/UT2/UT3 and the satellite 101B.

In some embodiments, one or more controllers can evaluate a link quality of a communication link according to a satellite location. For example, the controller 110 can evaluate the link quality of the communication link L11 according to a location of the satellite 101A. As another example, the controller 110 may evaluate the link quality of the communication link L11 according to a distance between the satellite 101A and the user terminal UT1. As still another example, the controller 110 can evaluate the link quality of the communication link L11 according to a predicted location of the satellite 101A. The evaluated link quality may represent a predicted link quality of the communication link L11. Note that a location of the satellite 101A, such as a current or predicted location, may be obtained using the satellite tracking module 554A.

Similarly, the controller 120 can determine the link quality of the communication link L12 according to a location of the satellite 101B or according to a distance between the satellite 101B and the user terminal UT1. The satellite tracking module 554B may be utilized to obtain the location of the satellite 101B, such as a current or predicted location.

At operation 606, respective controllers of different satellite constellations can coordinate with each other, and jointly schedule a user terminal connection (UT connection) at least according to satellite link quality information on the satellite constellations.

For example, the controller 120 can share the control information CI2 with the controller 110 via the communication link 570. The controller 110 can obtain the link quality information on the satellites 101A and 101B, and accordingly determine a candidate satellite for data transmission between the user terminal UT1 and a gateway. When the link quality information indicates that the link quality of the communication link L11 is higher than the link quality of the communication link L12, the satellite 101A can be selected as the candidate satellite. The controller 110 can assign the selected satellite to a UT connection, in which the user terminal UT1 can connect to the candidate satellite to access the Internet via a corresponding gateway, i.e. the gateway 330A. In addition, when the link quality information indicates that the link quality of the communication link L12 is higher than the link quality of the communication link L11, the satellite 101B can be selected as the candidate satellite. The controller 110 can assign the selected satellite to a UT connection, in which the user terminal UT1 can connect to the candidate satellite to access the Internet via a corresponding gateway, i.e. the gateway 330B.

Note that link quality information on the satellite constellation 10A and the link quality information on the satellite constellation 10B can be continuously updated by the controllers 110 and 120 respectively. Thus, the satellite communication system 300 can utilize the controllers 110 and 120 to jointly schedule the UT connection. Additionally, in some embodiments, when the satellite 101A is located closer to the user terminal UT1 than the satellite 101B, the link quality of the communication link L11 is higher than the link quality of the communication link L12; when the satellite 101B is closer to the user terminal UT1 than the satellite 101A, the link quality of the communication link L12 is higher than the link quality of the communication link L11.

Similarly, the controller 110 can share the control information CI1 with the controller 120 via the communication link 570. The controller 120 can receive the link quality information on the satellite 101A from the controller 110, and accordingly determine a candidate satellite for data transmission between the user terminal UT1 and a gateway.

In some embodiments, respective controllers of different satellite constellations may determine a candidate satellite according to the satellite link quality information and the satellite service capacity. For example, the controller 110/120 can be configured to select one from the satellites 101A and 101B as the candidate satellite according to the link quality of the communication link L11, the link quality of the communication link L12, a capacity of the satellite 101A and a capacity of the satellite 101B. A capacity of the selected satellite is sufficient for the data transmission between the user terminal UT1 and the corresponding gateway. Consider a case in which the link quality information indicates that the link quality of the communication link L11 is higher than the link quality of the communication link L12. When the satellite 101A has a sufficient capacity to support the data transmission between the user terminal UT1 and the gateway 330A, the controller 110/120 can select the satellite 101A as the candidate satellite. When the capacity of the satellite 101A is insufficient, and the capacity of the satellite 101B is sufficient to support the data transmission associated with the user terminal UT1, the controller 110/120 can select the satellite 101B as the candidate satellite.

At operation 608, the controllers can notify the user terminal of scheduling information, which can indicate a candidate satellite for data transmission. For example, the controller 110/120 can send scheduling information SCH to the user terminal UT1. When a satellite, e.g. the satellite 101A/101B, is selected for the UT connection according to the satellite link quality information on the satellite constellations 10A and 10B, the scheduling information SCH can indicate that the selected satellite is the candidate satellite. In other words, the scheduling information SCH can indicate that the selected satellite can be assigned to a UT connection, in which the user terminal UT1 can connect to the selected satellite to access the Internet via a corresponding gateway.

At operation 610, the user terminal can connect to an assigned satellite according to the scheduling information. For example, the user terminal UT2 can connect to the satellite 101A/101B according to the scheduling information SCH that indicates the satellite 101A/101B is selected as a candidate satellite for a UT connection. The selected satellite can be referred to as a serving satellite that serves the user terminal UT2. Next, the flow may return to operation 604 to update the satellite link quality information on the satellite constellations 10A and 10B.

Figure 7:
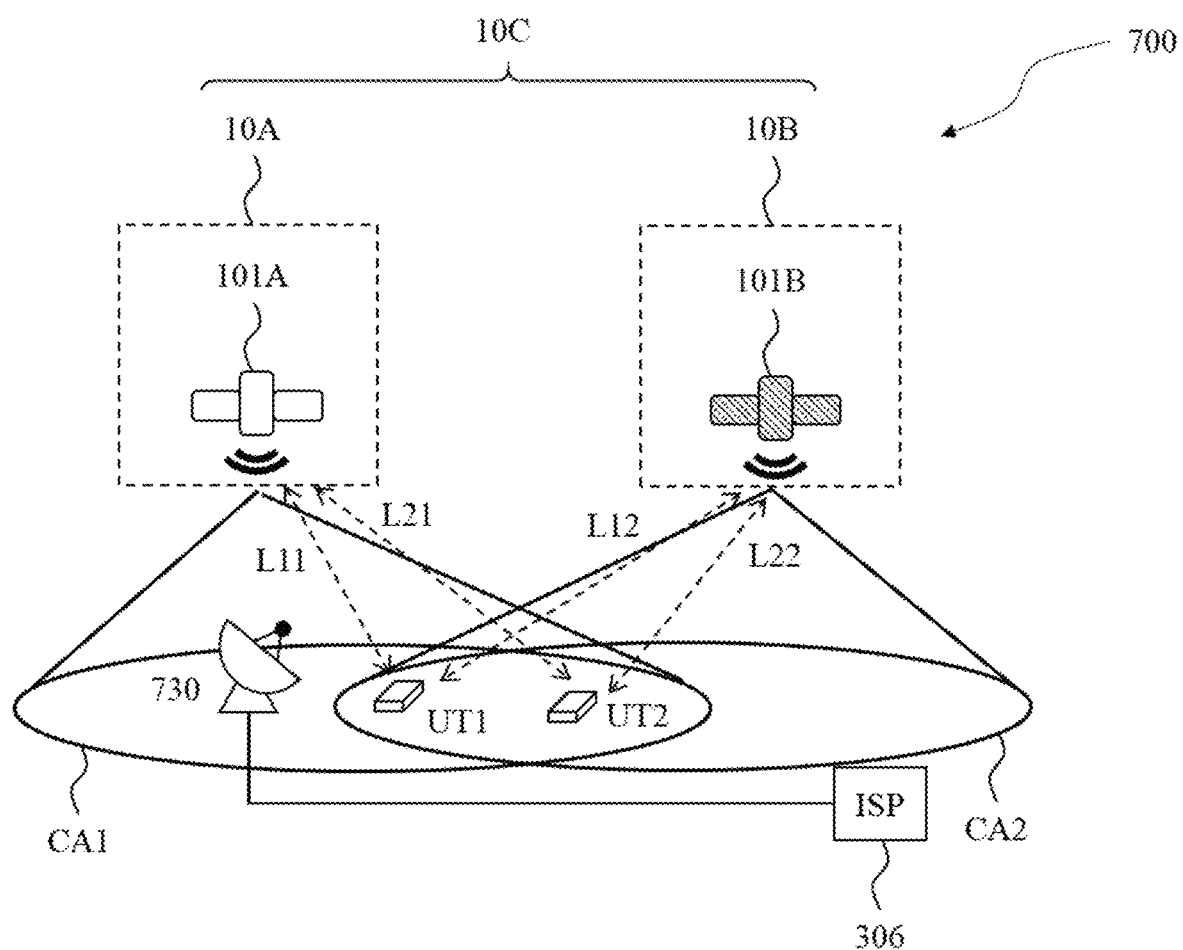
FIG. 7 illustrates another implementation of the satellite communication system shown in FIG. 1A in accordance with some embodiments of the present disclosure.

FIG. 7 illustrates another implementation of the satellite communication system 100 shown in FIG. 1A in accordance with some embodiments of the present disclosure. The satellite communication system 700 can employ the method 200 shown in FIG. 2 to provide a robust satellite link for the user terminal UT1/UT2. The architecture of the satellite communication system 700 is identical/similar to that of the satellite communication system 300 shown in FIG. 3 except for the gateway 730.

In the present embodiment, the gateway 730 can be shared by the satellite constellations 10A and 10B, and configured to route traffic from a communication network, such as the Internet, a terrestrial network, a public network or a private network, across a satellite link to the user terminal UT1/UT2. When the user terminal UT1/UT2 is located in the coverage area CA1 of the satellite constellation 10A, the gateway 730 may allow the user terminal UT1/UT2 to access the communication network via the satellite 101A. When the user terminal UT1/UT2 is located in the coverage area CA2 of the satellite constellation 10B, the gateway 730 may allow the user terminal UT1/UT2 to access the communication network via the satellite 101B.

Figure 8:
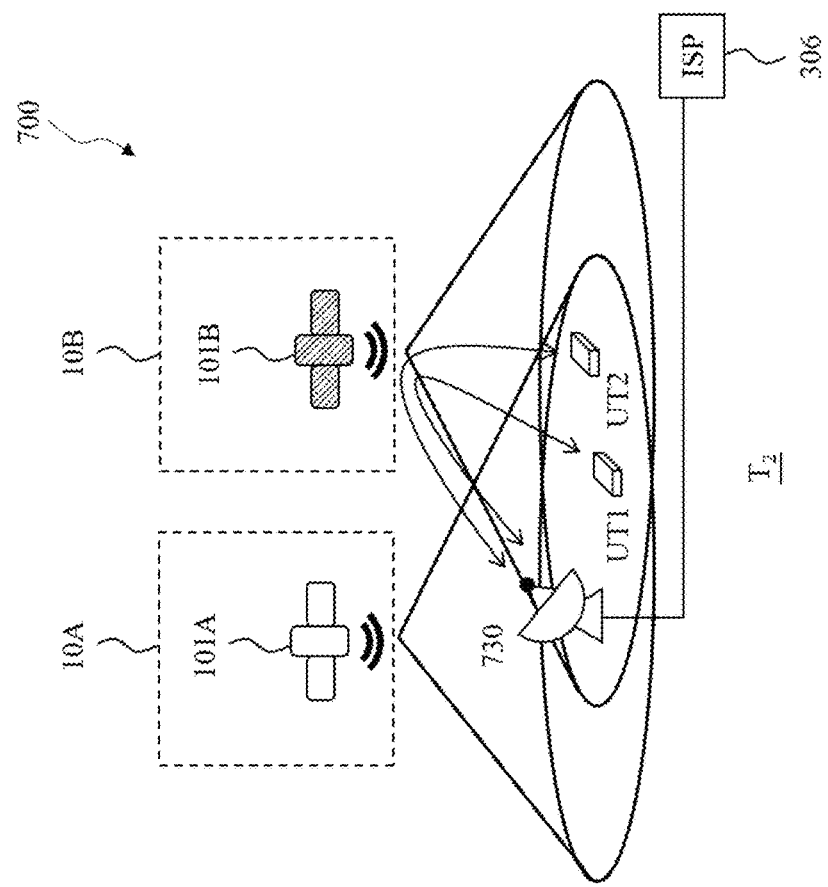
FIG. 8 illustrates an implementation of a network topology of the satellite communication system shown in FIG. 7 at different times in accordance with some embodiments of the present disclosure.
Figure 8:
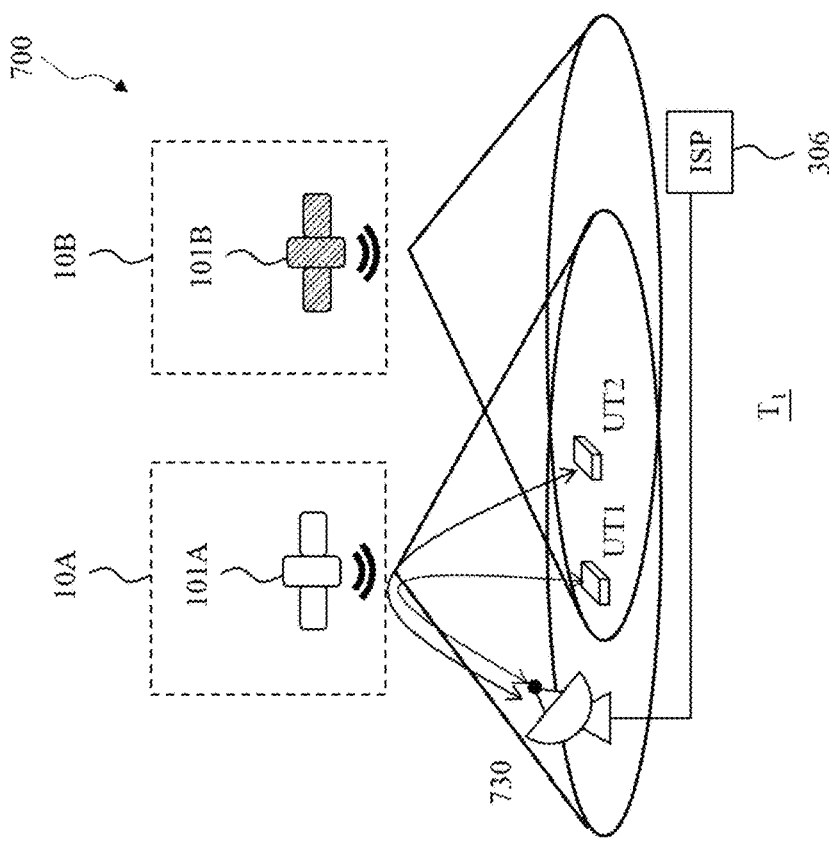

For example, referring to FIG. 8 and also to FIG. 7, the satellite 101A is located closer to the user terminal UT1/UT2 than the satellite 101B at time $T_1$. The communication link L11 may have a higher link quality than the communication link L12. The satellite 101A may be selected for data communication, and the user terminal UT1 can access the Internet via the satellite 101A and the gateway 730. In addition, the communication link L21 may have a higher link quality than the communication link L22. The satellite 101A may be selected for data communication, and the user terminal UT2 can access the Internet via the satellite 101A and the gateway 730.

At time $T_2$, the satellite 101B is located closer to the user terminal UT1/UT2 than the satellite 101A. The communication link L12 may have a higher link quality than the communication link L11, and the communication link L22 may have a higher link quality than the communication link L21. Thus, the satellite 101B may be selected for data communication, and the user terminal UT1/UT2 can access the Internet via the satellite 101B and the gateway 730.

Figure 9:
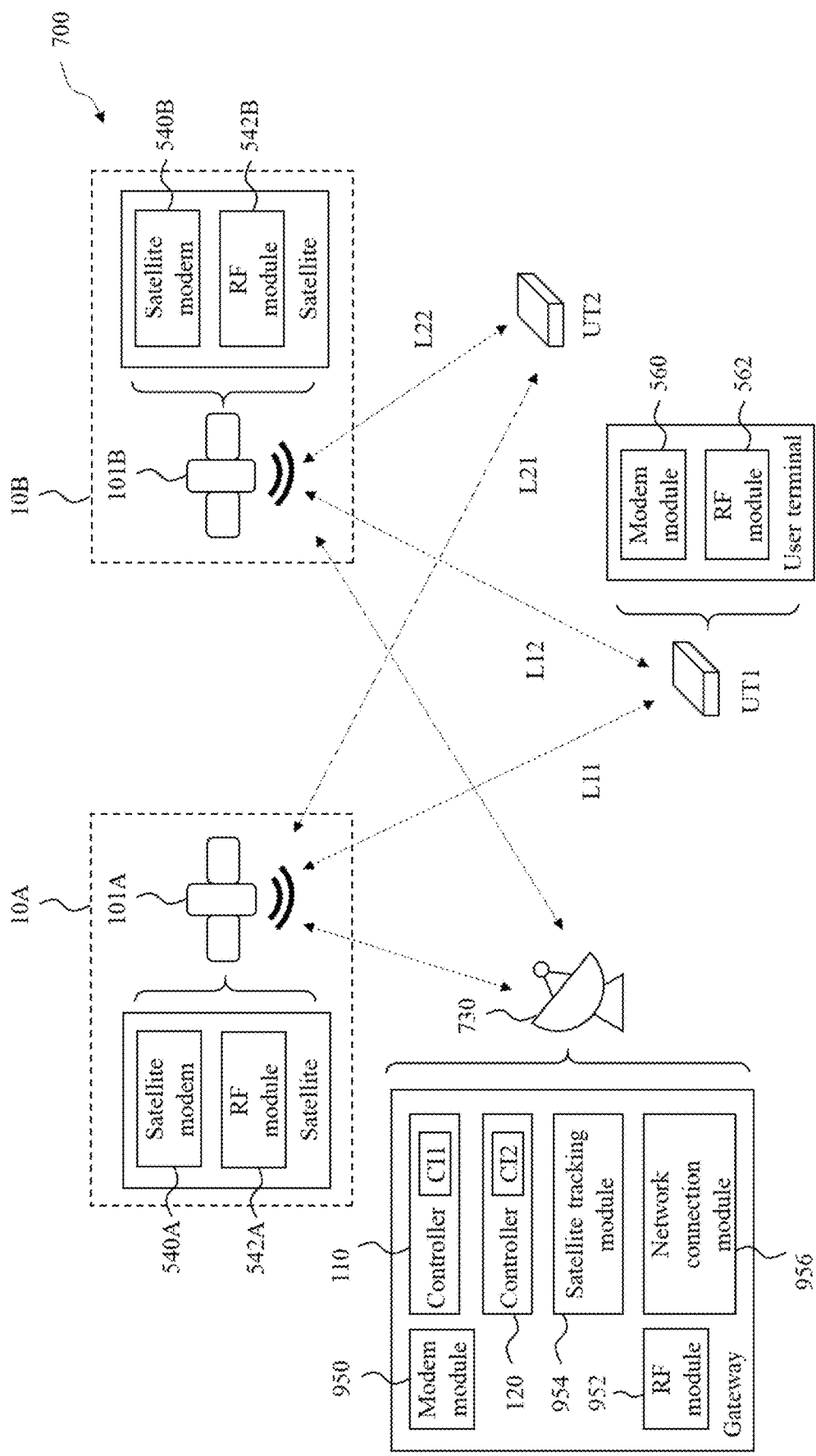
FIG. 9 illustrates an implementation of the satellite communication system 700 shown in FIG. 7 in accordance with some embodiments of the present disclosure.

FIG. 9 illustrates an implementation of the satellite communication system 700 shown in FIG. 7 in accordance with some embodiments of the present disclosure. The network device implementation shown in FIG. 7 is identical/similar to that shown in FIG. 3 except for the gateway 730.

In the present embodiment, the gateway 730 may include, but is not limited to, the controllers 110 and 120 shown in FIG. 1A, a modem module 950, an RF module 952, a satellite tracking module 954 and a network connection module 956. The modem module 950 can be arranged for signal modulation/demodulation associated with the satellite constellations 10A and 10B. The RF module 952 includes an antenna that can be arranged for transmitting/receiving RF signals. The satellite tracking module 954 can be configured to track each satellite of the satellite constellations 10A and 10B. The network connection module 956 can be configured to establish and terminate a network connection, such as an Internet connection. The controller 110 can be configured to control operation of the modem module 950, the RF module 952, the satellite tracking module 954 and the network connection module 956 to thereby manage flow of data in the satellite constellation 10A. The controller 120 can be configured to control operation of the modem module 950, the RF module 952, the satellite tracking module 954 and the network connection module 956 to thereby manage flow of data in the satellite constellation 10B. In the example of FIG. 9, the controllers 110 and 120 are coupled to each other within the gateway 730 to share satellite link quality information on the satellite constellations 10A and 10B.

In operation, the controller 110 can generate the control information CI1 indicative of a link quality of the communication link L11, and the controller 120 can generate the control information CI2 indicative of a link quality of the communication link L12. The controller 110 may receive the control information CI2 from the controller 120, and select one from the satellites 101A and 101B as a candidate satellite for a UT connection at least according to the link quality of the communication link L11 and the link quality of the communication link L12. Alternatively, the controller 120 may receive the control information CI1 from the controller 110, and select one from the satellites 101A and 101B as a candidate satellite for a UT connection at least according to the link quality of the communication link L11 and the link quality of the communication link L12.

As those skilled in the art should appreciate the operation of the satellite communication system 700 shown in FIG. 9 after reading the above paragraphs directed to FIG. 1A to FIG. 8, further description is not repeated here for brevity. Note that in some embodiments, the satellite communication system 700 shown in FIG. 7, FIG. 8 or FIG. 9 can employ the method 600 shown in FIG. 6 to provide an extended coverage area and a robust satellite link for each user terminal.

The satellite network topologies and network device implementations described above are provided for illustrative purposes, and are not intended to limit the scope of the present disclosure. For example, in some embodiments, a controller of a satellite constellation may be disposed in a satellite of the satellite constellation, while a controller of another satellite constellation may be disposed in a satellite of the another satellite constellation. In some embodiments, a controller of a satellite constellation may be disposed in a user terminal, while a controller of another satellite constellation may be disposed in another user terminal.

Figure 10:
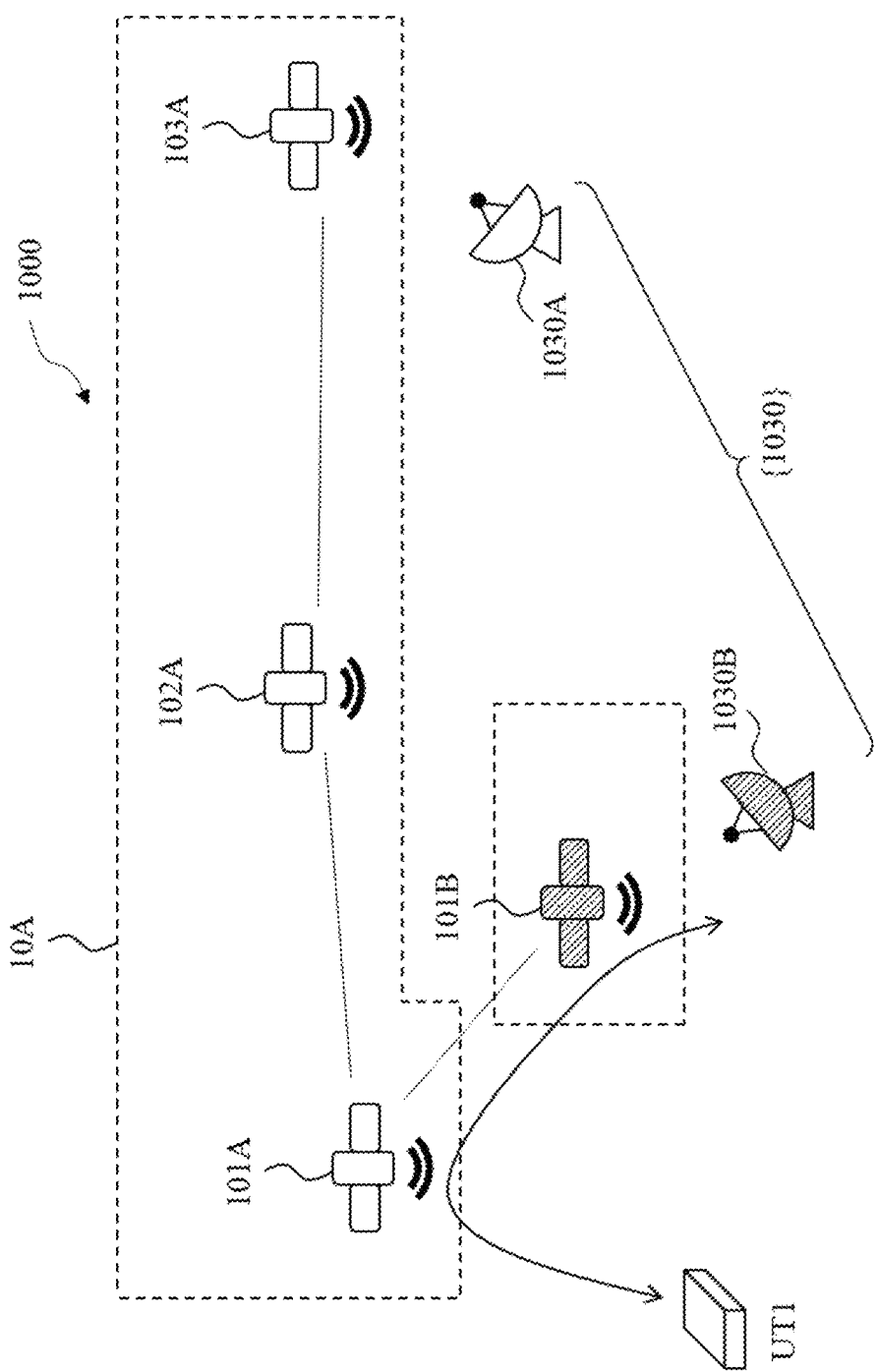
FIG. 10 illustrates another implementation of the satellite communication system shown in FIG. 1A in accordance with some embodiments of the present disclosure.

FIG. 10 illustrates another implementation of the satellite communication system 100 shown in FIG. 1A in accordance with some embodiments of the present disclosure. The satellite communication system 1000 can employ the method 200 shown in FIG. 2 to reduce latency in data communication. The satellite communication system 1000 may include the satellite constellations 10A and 10B shown in FIG. 1A, and a set of gateways {1030}. The satellite constellation 10A may include a plurality of satellites 101A-103A. The satellite constellation 10B may include a satellite 101B. In the example of FIG. 10, two satellites belonging to the same satellite constellation can be connected to each other via an intersatellite link. In addition, two satellites belonging to different satellite constellations can be connected to each other via an intersatellite link.

Each gateway in the set of gateways {1030} can be configured to route traffic from a communication network, such as the Internet, a terrestrial network, a public network or a private network, across a satellite link to the user terminal UT1. The satellite link may include at least one satellite of the satellite constellation 10A and at least one satellite of the satellite constellation 10B. The user terminal UT1 can support both the satellite constellations 10A and 10B.

In the present embodiment, a gateway can be selected from among the set of gateways {1030} as a candidate gateway for connecting the user terminal UT1 to the communication network. The selected gateway may be a gateway nearest to the user terminal UT1 among the set of gateways {1030}. A data transmission path between the user terminal UT1 and the selected gateway may be a shortest path for routing the traffic from the communication network to the user terminal UT1.

For example, the set of gateways {1030} may include the gateways 1030A and 1030B. When the gateway 1030A is used for traffic routing, it would take three satellites, i.e. the satellites 101A-103A, to route the traffic between the user terminal UT1 and the gateway 1030A. In contrast, when the gateway 1030B is used for traffic routing, it would take two satellites, i.e. the satellites 101A and 101B, to route the traffic between the user terminal UT1 and the gateway 1030B. Thus, the gateway 1030B, which is located nearer to the user terminal UT1 than the gateway 1030A, can be selected for routing the traffic from the user terminal UT1 to reduce latency in data communication.

Figure 11:
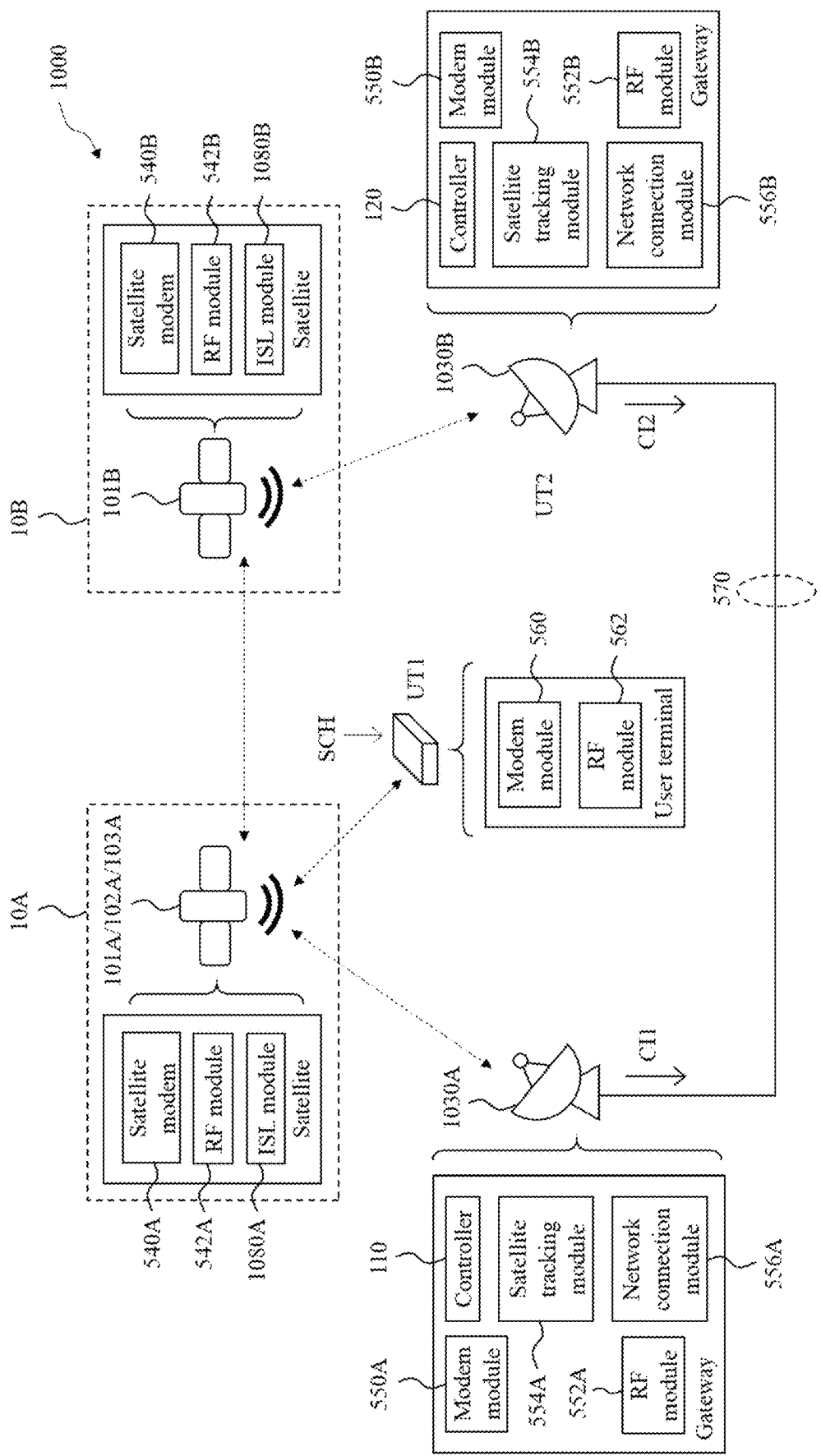
FIG. 11 illustrates an implementation of the satellite communication system shown in FIG. 10 in accordance with some embodiments of the present disclosure.

FIG. 11 illustrates an implementation of the satellite communication system 1000 shown in FIG. 10 in accordance with some embodiments of the present disclosure. In the present embodiment, each of the satellites 101A-103A may include, but is not limited to, the satellite modem 540A and the RF module 542A shown in FIG. 5, and an intersatellite link module (ISL module) 1080A. The ISL module 1080A can be configured to enable connection of the satellite 101A/102A/103A and another satellite, such as a satellite of the satellite constellation 10A/10B. Similarly, the satellite 101B may include, but is not limited to, the satellite modem 540B and the RF module 542B shown in FIG. 5, and an ISL module 1080B. The ISL module 1080B can be configured to enable connection of the satellite 101B and another satellite, such as a satellite of the satellite constellation 10A/10B. In addition, the gateways 1030A may include the controller 110 shown in FIG. 1A, and the modem module 550A, the RF module 552A, the satellite tracking module 554A and the network connection module 556A shown in FIG. 5. The gateways 1030B may include the controller 120 shown in FIG. 1A, and the modem module 550B, the RF module 552B, the satellite tracking module 554B, the network connection module 556B shown in FIG. 5.

In operation, the satellite tracking module 554A may be utilized to obtain a location of each satellite of the satellite constellation 10A; the satellite tracking module 554B may be utilized to obtain a location of each satellite of the satellite constellation 10B. The controller 110 may obtain, from the satellite tracking module 554A, the control information CI1 indicative of the location of each satellite of the satellite constellation 10A. The controller 120 may obtain, from the satellite tracking module 554B, the control information CI2 indicative of a location of each satellite of the satellite constellation 10B. In addition, the controller 120 may share the control information CI2 with the controller 110. The controller 110 can select, according to the location of each satellite of the satellite constellations 10A and 10B, one from among the set of gateways {1030} as a candidate gateway for connecting the user terminal UT1 to a communication network. The data transmission path between the user terminal UT1 and the candidate gateway may include at least one satellite of the satellite constellation 10A and at least one satellite of the satellite constellation 10B. In other words, the user terminal UT1 may access the communication network via at least one intersatellite link that is established between satellites belonging to different satellite constellations.

In the present embodiment, the controller 110 may determine a shortest path according to the location of each satellite of the satellite constellations 10A and 10B, thereby determining the candidate gateway. The shortest path can be used for routing the traffic from the user terminal UT1 to the communication network. For example, the number of satellites in a data transmission path between the user terminal UT1 and the gateway 1030B is less than the number of satellites in a data transmission path between the user terminal UT1 and the gateway 1030A. The controller 110 may determine that the data transmission path between the user terminal UT1 and the gateway 1030B is the shortest path for traffic routing. The gateway 1030B may be regarded as a gateway nearest to the user terminal UT1 among the set of gateways {1030}. The controller 110 may select the gateway 1030B as the candidate gateway.

Alternatively, the controller 110 may share the control information CI1 with the controller 120. The controller 120 can select, according to the location of each satellite of the satellite constellations 10A and 10B, one from among the set of gateways {1030} as a candidate gateway for connecting the user terminal UT1 to a communication network. The selected gateway may be regarded as a gateway nearest to the user terminal UT1 among the set of gateways {1030}. For example, the number of satellites in a data transmission path between the user terminal UT1 and the selected gateway is less than a number of satellites in a data transmission path between the user terminal and each unselected gateway.

Note that the gateways 1030A and 1030B may be distant from the user terminal UT1. With the use of the proposed satellite communication scheme, the satellite communication system 1000 can select a shortest path that may include an intersatellite link between different satellite constellations, thereby reducing network latency between a user terminal and a gateway that is distant from the user terminal.

Figure 12:
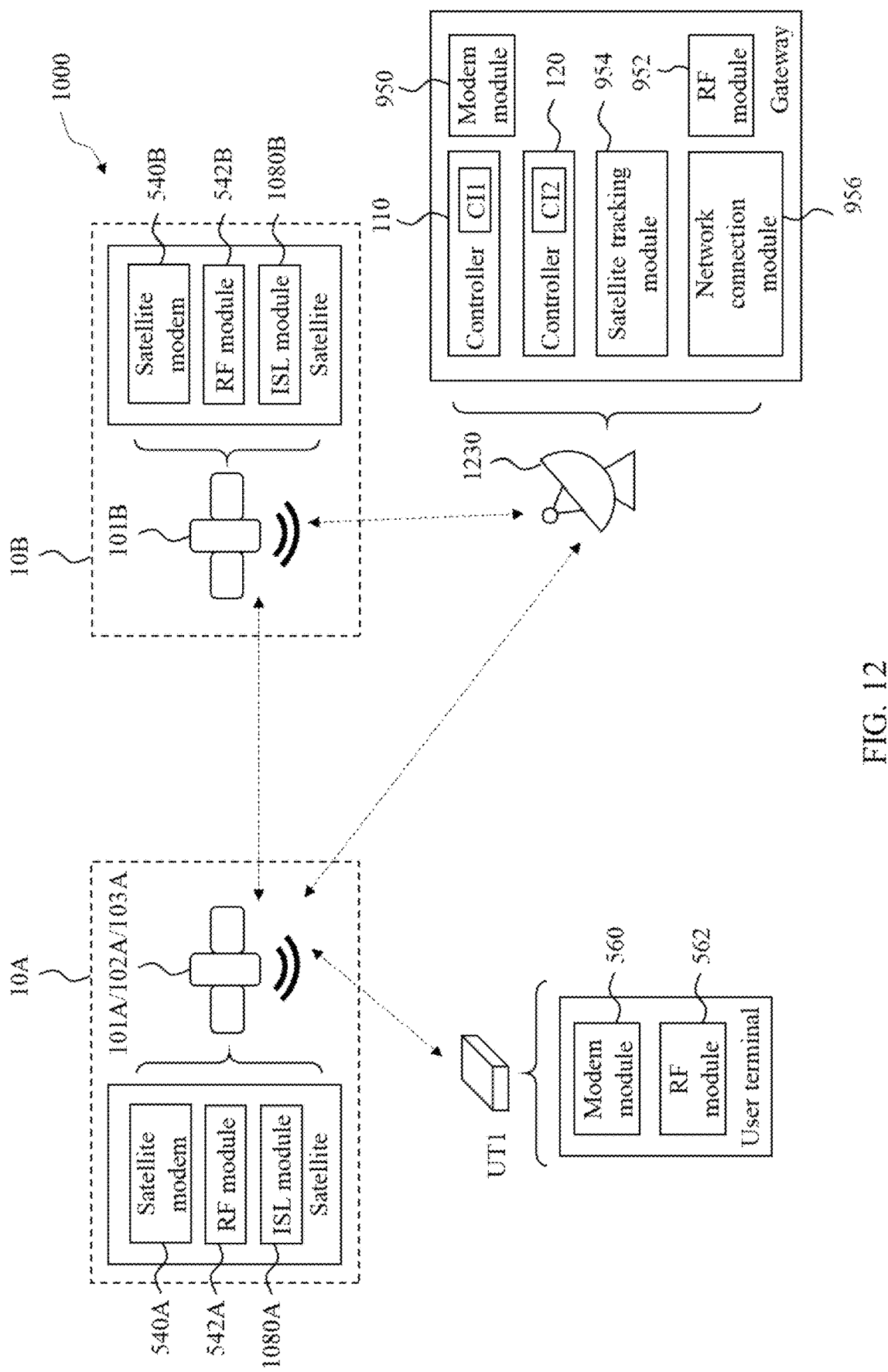
FIG. 12 illustrates another implementation of the satellite communication system shown in FIG. 10 in accordance with some embodiments of the present disclosure.

FIG. 12 illustrates another implementation of the satellite communication system 1000 shown in FIG. 10 in accordance with some embodiments of the present disclosure. The network device implementation shown in FIG. 12 is identical/similar to that shown in FIG. 11 except for the gateway 1230. The gateway 1230, shared by the satellite constellations 10A and 10B, may serve as an embodiment of the gateway 1030A/1030B shown in FIG. 10. In the present embodiment, the gateway 1230 may include, but is not limited to, the controllers 110 and 120 shown in FIG. 1A, and the modem module 950, the RF module 952, the satellite tracking module 954 and the network connection module 956 shown in FIG. 9. As those skilled in the art should appreciate the operation of the satellite communication system 1000 shown in FIG. 12 after reading the above paragraphs directed to FIG. 1A to FIG. 11, further description is not repeated here for brevity.

Figure 13:
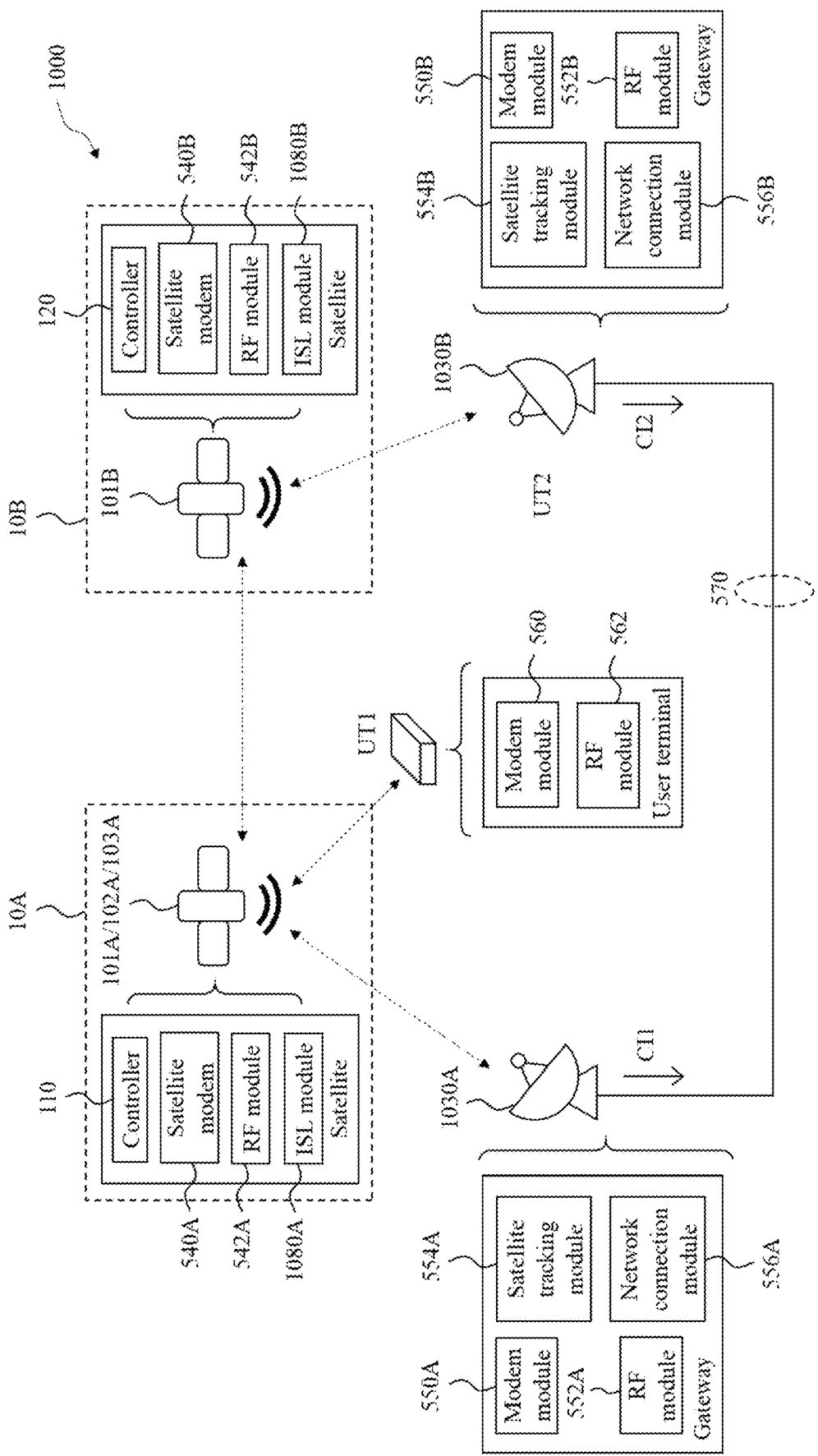
FIG. 13 illustrates another implementation of the satellite communication system shown in FIG. 10 in accordance with some embodiments of the present disclosure.

FIG. 13 illustrates another implementation of the satellite communication system 1000 shown in FIG. 10 in accordance with some embodiments of the present disclosure. The network device implementation shown in FIG. 13 is identical/similar to that shown in FIG. 11 except that the controllers 110 and 120 can be disposed in the satellites 101A and 101B respectively. In operation, one of the controllers 110 and 120 may share corresponding control information with the other, thereby determining a candidate gateway or a shortest path for routing the traffic from the user terminal UT1. As those skilled in the art should appreciate the operation of the satellite communication system 1000 shown in FIG. 13 after reading the above paragraphs directed to FIG. 1A to FIG. 12, further description is not repeated here for brevity.

Figure 14:
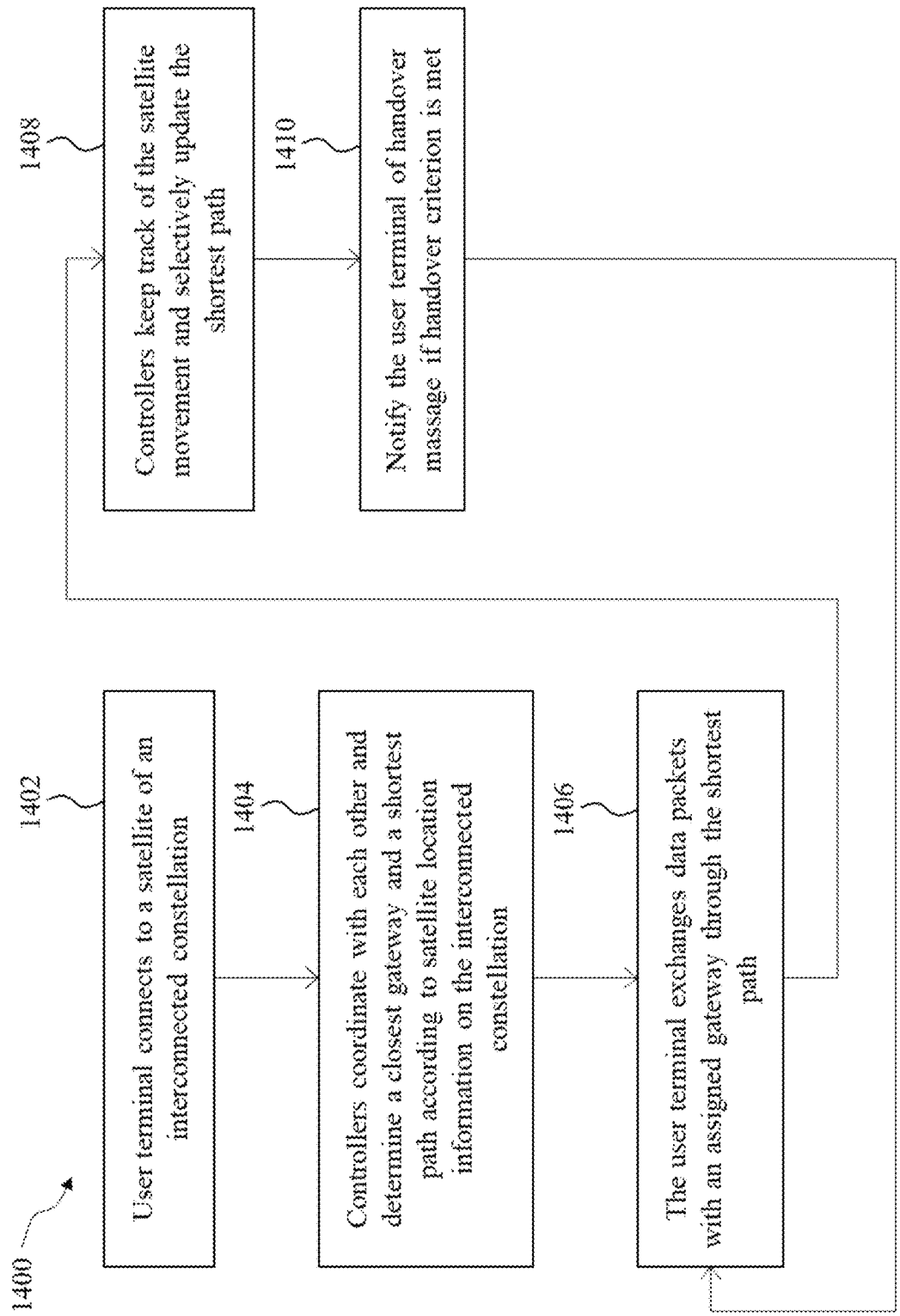
FIG. 14 is a flow chart of an exemplary method for operating a satellite communication system in accordance with some embodiments of the present disclosure.

FIG. 14 is a flow chart of an exemplary method for operating a satellite communication system in accordance with some embodiments of the present disclosure. The method 1400 can serve as an implementation of the method 200 show in FIG. 2. The satellite communication system 1000 shown in FIG. 10, FIG. 11, FIG. 12 or FIG. 13 can employ the method 1400 to reduce latency in data communication. For illustrative purposes, the method 1400 is described below with reference to the satellite communication system 1000 shown in FIG. 11. Those skilled in the art can appreciate that the method 1400 can be applied to the satellite communication system 100 shown in FIG. 1A or other implementations the satellite communication system 1000 shown in FIG. 10 without departing from the scope of the present disclosure.

Referring to FIG. 14 and also to FIG. 11, at operation 1402, a user terminal may connect to a satellite of an interconnected constellation. For example, the user terminal UT1 can support both the satellite constellations 10A and 10B. When the user terminal UT1 is located in an overlapping coverage area of the satellites 101A and 101B, the user terminal UT1 can connect to the satellite 101A or the satellite 101B.

At operation 1404, respective controllers of different satellite constellations can coordinate with each other, and determine a candidate gateway and an associated data transmission path for routing traffic from the user terminal. The candidate gateway may be, but is not limited to, a closest gateway to the user terminal. The data transmission path may be, but is not limited to, a shortest path for traffic routing.

For example, the controller 110 can obtain the control information CI1 indicative of a location of each satellite of the satellite constellation 10A; the controller 120 can obtain the control information CI2 indicative of a location of each satellite of the satellite constellation 10B. The controller 110 may share the control information CI1 with the controller 120, and/or the controller 120 may share the control information CI2 with the controller 110. In other words, satellite location information may be shared among different satellite constellations. The controller 110/120 can select the gateway 1030B from among the set of gateways {1030} as a candidate gateway for connecting the user terminal UT1 to a communication network such as the Internet. The number of satellites in a data transmission path between the user terminal UT1 and the selected gateway 1030B may be less than the number of satellites in a data transmission path between the user terminal UT1 and each unselected gateway in the set of gateways {1030}. In other words, the gateway 1030B can be a closest gateway to the user terminal UT1, and the data transmission path between the user terminal UT1 and the selected gateway 1030B can be a shortest path for traffic routing.

At operation 1406, the user terminal can exchange data packets with the candidate gateway assigned thereto through the associated data transmission path. Relay satellites in the data transmission path may include satellites belonging to different satellite constellations.

For example, the controller 110/120 may send the scheduling information SCH to the user terminal UT1. When a gateway, e.g. the gateway 1030B, is selected for traffic routing, the scheduling information SCH can indicate that the selected gateway is the candidate gateway. In other words, the gateway 1030B can be assigned to the user terminal UT1. The user terminal UT1 can exchange data packets with the gateway 1030B through a data transmission path according to the scheduling information SCH. The serving satellites in the data transmission path, e.g. the satellites 101A and 101B, may belong to different satellite constellations.

At operation 1408, respective controllers of different satellite constellations can keep track of the satellite movement, and selectively update the shortest path according to the satellite movement. For example, the satellite tracking module 554A/554B may keep track of the satellite movement of the satellite constellation 10A/10B. The control information CI1/CI2 can be continuously updated. The controllers 110 and 120 may coordinate with each other, and determine whether to update the shortest path and/or the candidate gateway. When the shortest path or the candidate gateway is updated, a serving satellite that serves the user terminal UT1 may change accordingly.

At operation 1410, at least one the controller can notify the user terminal of a handover message if a handover criterion is met. The handover criterion can be met when a serving satellite for the user terminal changes. For example, when the satellite 102A is located closer to the user terminal UT1 than the satellite 101A, the serving satellite for the user terminal UT may be changed to the satellite 102A. The controller 110/120 may send the scheduling information SCH indicative of an updated shortest path for traffic routing. Next, the flow may return to operation 1406. The user terminal UT1 can be handed over to the satellite 102A. The user terminal UT1 can exchange data packets with an assigned gateway, which may be updated according to the satellite movement, through a corresponding data transmission path.

Figure 15:
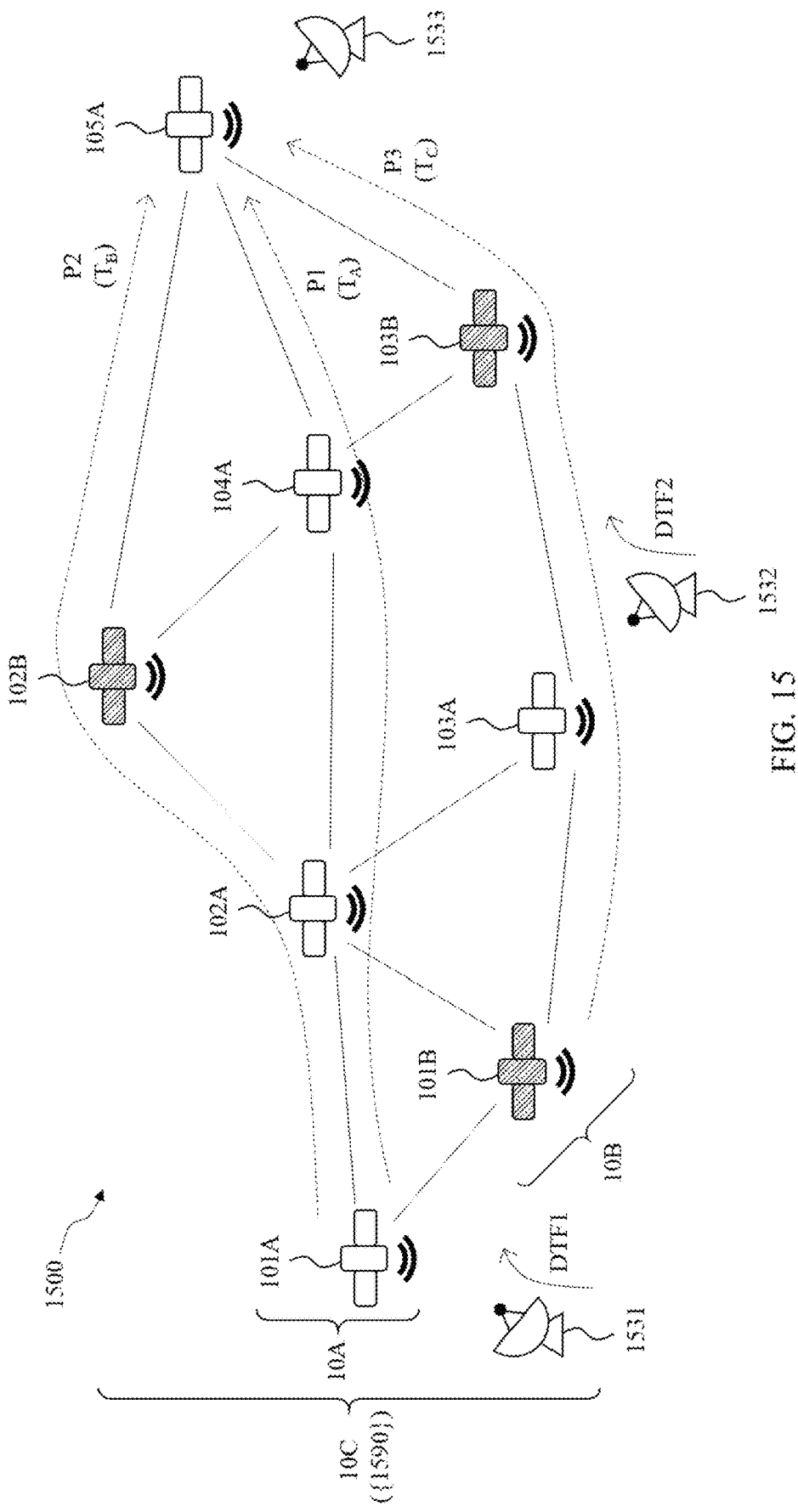
FIG. 15 illustrates another implementation of the satellite communication system shown in FIG. 1A in accordance with some embodiments of the present disclosure.

FIG. 15 illustrates another implementation of the satellite communication system 100 shown in FIG. 1A in accordance with some embodiments of the present disclosure. The satellite communication system 1500 can employ the method 200 shown in FIG. 2 to optimize scheduling and routing of the overall network traffic load. In the present embodiment, the satellite communication system 1500 may include the satellite constellations 10A and 10B shown in FIG. 1A, and a set of terrestrial terminals. The satellite constellation 10A may include a plurality of satellites 101A-105A. The satellite constellation 10B may include a plurality of satellites 101B-103B. Satellites belonging to the same satellite constellation or different satellite constellations can be connected to each other via an intersatellite link.

The set of terrestrial terminals may include, but is not limited to, a plurality of terrestrial terminals 1531-1533, each of which may serve as a source terrestrial terminal or a destination terrestrial terminal. In addition, each of the terrestrial terminals 1531-1533 can support both the satellite constellations 10A and 10B. In the example of FIG. 15, the terrestrial terminal 1531/1532/1533 is implemented using a gateway for illustrative purposes. This is however not intended to be limiting. At least one terrestrial terminal in the set of terrestrial terminals may be implemented using a user terminal or various types of ground stations without departing from the scope of the present disclosure.

In operation, the satellite communication system 1500 may select one from among a set of data transmission paths {1590} as a candidate data transmission path for a data traffic flow from a source terrestrial terminal to a destination terrestrial terminal. The candidate data transmission path may vary in response to the traffic load information on the interconnected constellation 10C. For example, the terrestrial terminals 1531 and 1533 can serve as the source terrestrial terminal and the destination terrestrial terminal, respectively. The traffic load information on the interconnected constellation 10C can indicate that a traffic load of each satellite included in the set of data transmission paths {1590}. The satellite communication system 1500 may select one from among the set of data transmission paths {1590}, e.g. one of the data transmission paths P1-P3, as a candidate data transmission path that meets a traffic demand of a data traffic flow DTF1 (from the terrestrial terminal 1531 to the terrestrial terminal 1533). The data traffic flow DTF1 can be directed along a different route in response to the traffic load information. In other words, the satellite communication system 1500 can adapt a transmission path of the data traffic flow DTF1 to a time-varying network topology thereof.

Additionally or alternatively, satellite utilization of the interconnected constellation 10C obtained when the selected data transmission path is used as the candidate data transmission path is higher than satellite utilization of the interconnected constellation 10C obtained when an unselected data transmission path is used as the candidate data transmission path. The satellite utilization can be determined according to a ratio between the average data-rate per satellite and the maximum data-rate per satellite. With the use of the proposed satellite communication scheme, the satellite communication system 1500 can optimize the network capacity and usage.

Similarly, when the terrestrial terminals 1532 and 1533 serve as the source terrestrial terminal and the destination terrestrial terminal, respectively, the satellite communication system 1500 may select one from among a set of data transmission paths as a candidate data transmission path that meets a traffic demand of a data traffic flow DTF2 (from the terrestrial terminal 1532 to the terrestrial terminal 1533). In other words, both the data traffic flows DTF1 and DTF2 can be adapted to a time-varying network topology. For illustrative purposes, the proposed network traffic routing scheme is described below with reference to the data traffic flow DTF1. Those skilled in the art will appreciate that the proposed network traffic routing scheme can be applied to optimize the scheduling/routing of the data traffic flow DTF2.

Figure 16:
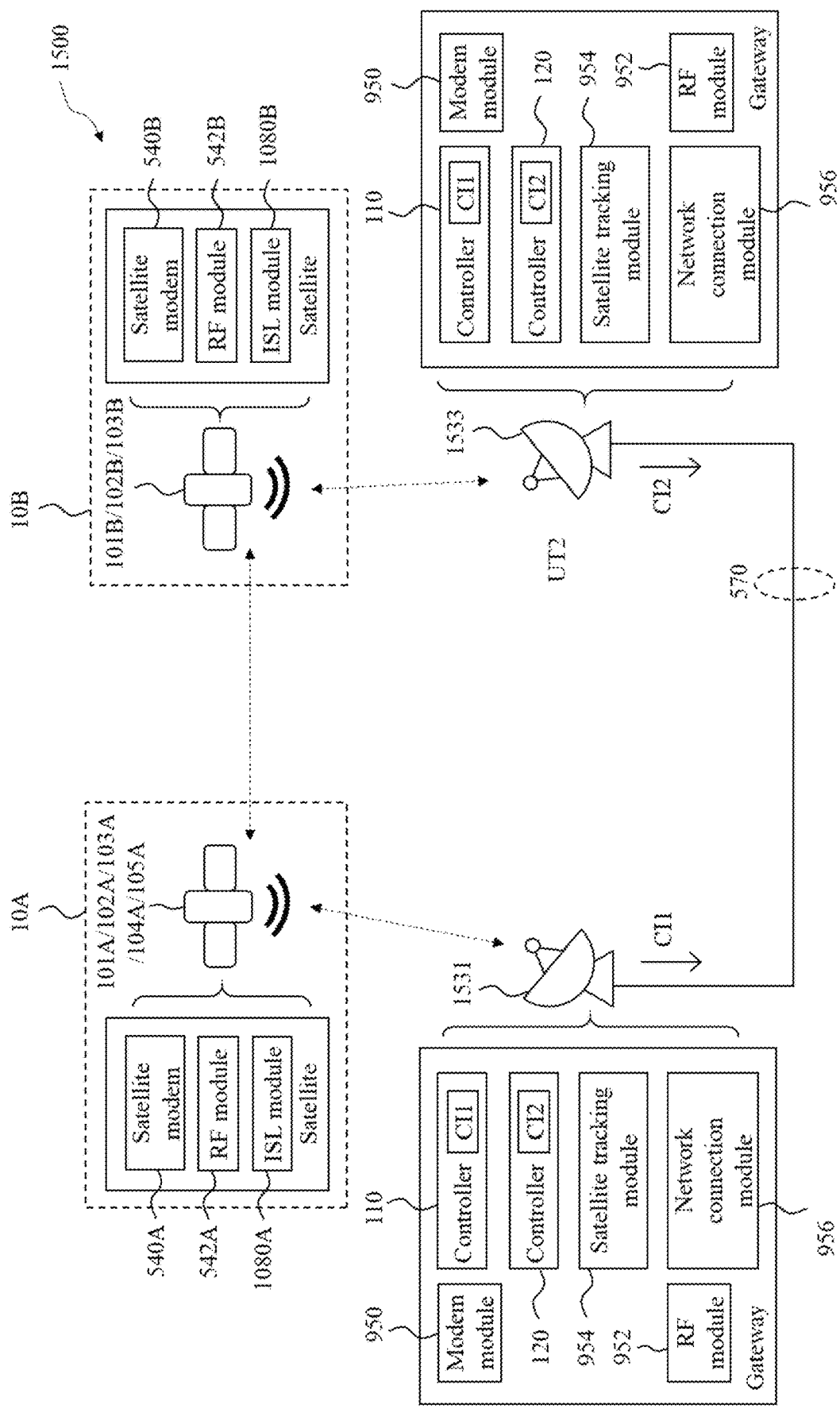
FIG. 16 illustrates an implementation of the satellite communication system shown in FIG. 15 in accordance with some embodiments of the present disclosure.

FIG. 16 illustrates an implementation of the satellite communication system 1500 shown in FIG. 15 in accordance with some embodiments of the present disclosure. Each of the satellites 101A-105A shown in FIG. 16 can be implemented using the satellite modem 540A, the RF module 542A and the ISL module 1080A shown in FIG. 11. Each of the satellites 101B-103B shown in FIG. 16 can be implemented using the satellite modem 540B, the RF module 542B and the ISL module 1080B shown in FIG. 11. In addition, each of the terrestrial terminals 1531 and 1533 may be implemented using the gateway 1230 shown in FIG. 12. For example, the terrestrial terminal 1531/1533 may include the controllers 110 and 120 shown in FIG. 1A, and the modem module 950, the RF module 952, the satellite tracking module 954 and the network connection module 956 shown in FIG. 9.

Referring to FIG. 16 and also to FIG. 15, in operation, the controller 110 may obtain the control information CI1 indicative of a traffic load of each satellite of the satellite constellation 10A, and obtain the traffic demand of the data traffic flow DTF1. The controller 120 may obtain the control information CI2 indicative of a traffic load of each satellite of the satellite constellation 10B, and share the control information CI2 with the controller 110. The controller 110 can select one from among the set of data transmission paths {1590} as a candidate data transmission path for the data traffic flow DTF1 according to the traffic demand, the traffic load of each satellite of the satellite constellation 10A, and the traffic load of each satellite of the satellite constellation 10B. The selected data transmission path may include at least one satellite of the satellite constellation 10A and at least one satellite of the satellite constellation 10B.

For example, at time $T_A$, the data traffic flow DTF1 may be directed along the data transmission path P1 (includes the satellites 101A, 102A, 104A and 105A). When the traffic load of the satellite 104A increases or the network topology changes, the satellite utilization of the interconnected constellation 10C may decrease. The satellite communication system 1500 may select the data transmission path P2 (including the satellites 101A, 102A, 102B and 105A) as the candidate data transmission path, and redirect the data traffic flow DTF1 along the data transmission path P2 (at time $T_B$) to balance the satellite resource. Data packets transmitted from the satellite 102A may be rerouted to the satellite 102B, whose traffic load may be less than that of the satellite 104A at time $T_B$.

As another example, at time Tc, the satellite utilization obtained when the data transmission path P3 (including the satellites 101B, 103A, 103B and 105A) is used as the candidate data transmission path is higher than the satellite utilization obtained when each of the data transmission paths P1 and P2 is used as the candidate data transmission path. The satellite communication system 1500 may select the data transmission path P3 as the candidate data transmission path, and direct the data traffic flow DTF1 along the data transmission path P3.

Alternatively, the controller 110 may share the control information CI1 with the controller 120. The controller 120 can select one from among the set of data transmission paths {1590} as a candidate data transmission path for the data traffic flow DTF1 according to the traffic demand, the traffic load of each satellite of the satellite constellation 10A, and the traffic load of each satellite of the satellite constellation 10B. The controller 110/120 may provide common traffic control actions or protocols among the satellite constellations 10A and 10B to realize traffic optimization.

With the use of the proposed satellite communication scheme, the satellite communication system 1500 can enable a resilient satellite network by changing the routing decisions according to the traffic load information shared among different satellite constellations. The proposed satellite communication scheme can improve the satellite utilization in long haul communications in which a destination terrestrial terminal is distant from a source terrestrial terminal.

Figure 17:
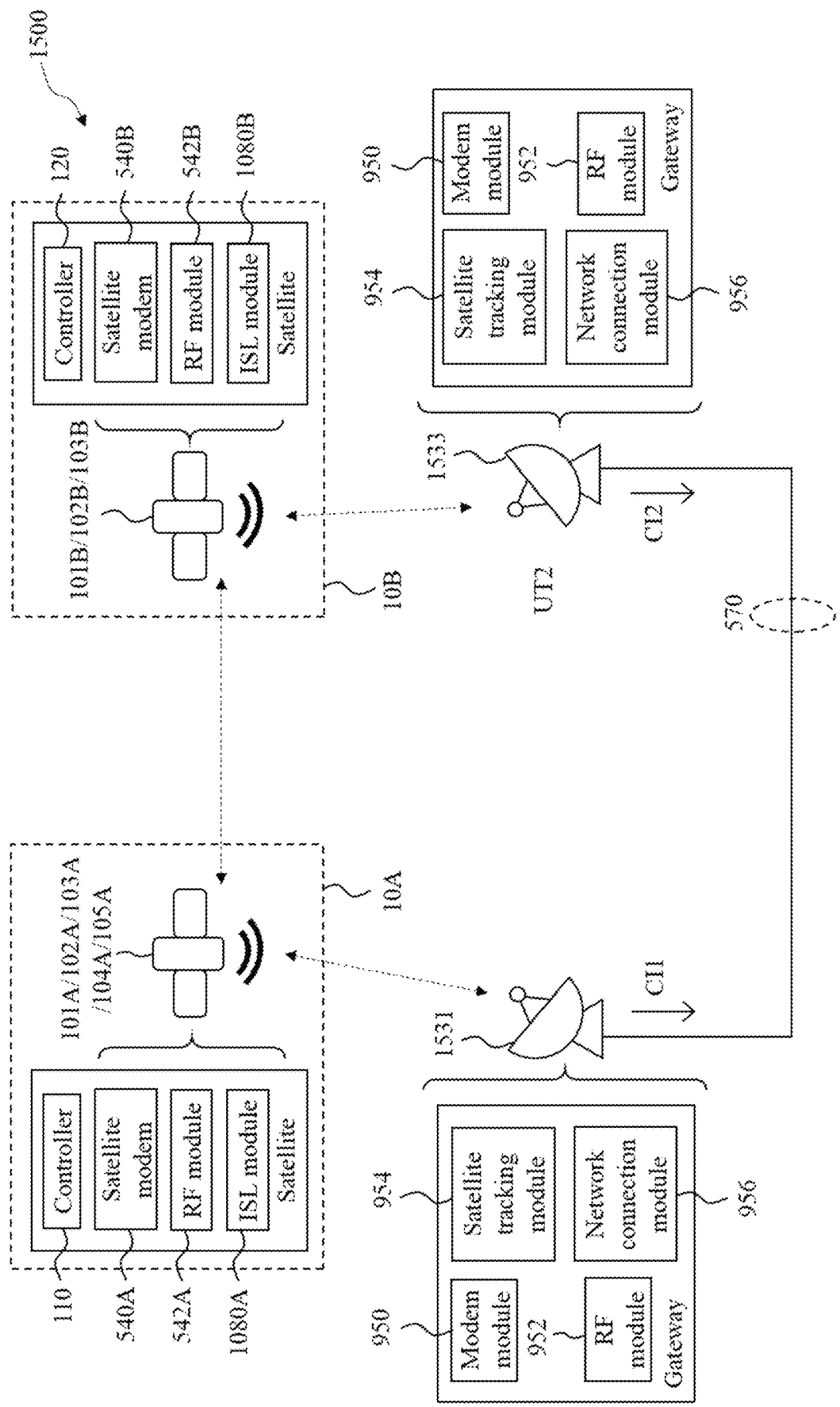
FIG. 17 illustrates another implementation of the satellite communication system shown in FIG. 15 in accordance with some embodiments of the present disclosure.

FIG. 17 illustrates another implementation of the satellite communication system 1500 shown in FIG. 15 in accordance with some embodiments of the present disclosure. The network device implementation shown in FIG. 17 is identical/similar to that shown in FIG. 16 except that the controllers 110 and 120 can be disposed in the satellites 101A and 101B respectively. In operation, one of the controllers 110 and 120 may share corresponding control information with the other, thereby determining a candidate data transmission path for the data traffic flow DTF1. As those skilled in the art should appreciate the operation of the satellite communication system 1500 shown in FIG. 17 after reading the above paragraphs directed to FIG. 1A to FIG. 16, further description is not repeated here for brevity.

Figure 18:
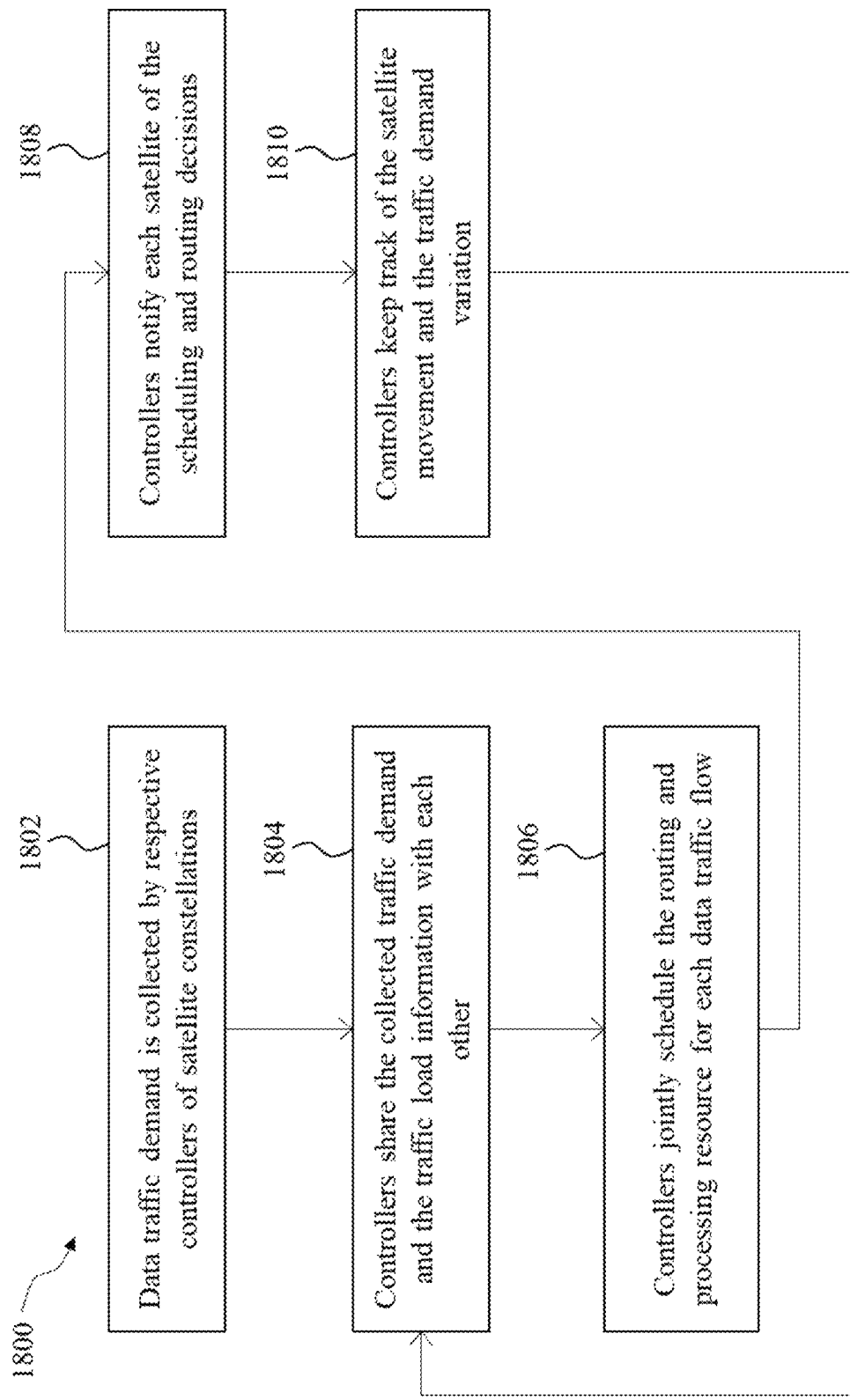
FIG. 18 is a flow chart of an exemplary method for operating a satellite communication system in accordance with some embodiments of the present disclosure.

FIG. 18 is a flow chart of an exemplary method for operating a satellite communication system in accordance with some embodiments of the present disclosure. The method 1800 can serve as an implementation of the method 200 show in FIG. 2. The satellite communication system 1500 shown in FIG. 15, FIG. 16 or FIG. 17 can employ the method 1800 to optimize scheduling and routing of the overall network traffic load. For illustrative purposes, the method 1800 is described below with reference to the satellite communication system 1500 shown in FIG. 16. Those skilled in the art can appreciate that the method 1800 can be applied to the satellite communication system 100 shown in FIG. 1A or other implementations the satellite communication system 1500 shown in FIG. 15 without departing from the scope of the present disclosure.

Referring to FIG. 18 and also to FIG. 16, at operation 1802, a traffic demand of a data traffic flow from a source terrestrial terminal is collected by an associated controller of a satellite constellation. For example, the controller 110 may obtain a traffic demand of a data traffic flow from each source terrestrial terminal connected to the satellite constellation 10A; the controller 120 may obtain the a traffic demand of a data traffic flow from each source terrestrial terminal connected to the satellite constellation 10B.

At operation 1804, respective controllers of different satellite constellations can share control information with each other. The control information can include the collected traffic demand and traffic load information on an associated satellite constellation. For example, the controller 110 can obtain the control information CI1 indicative of a traffic load of each satellite of the satellite constellation 10A, and the controller 120 can obtain the control information CI2 indicative of a traffic load of each satellite of the satellite constellation 10B. The control information CI1 may further indicate the overall traffic demand associated with the satellite constellation 10A. The control information CI2 may further indicate the overall traffic demand associated with the satellite constellation 10B. The controller 110 may share the control information CI1 with the controller 120, and/or the controller 120 may share the control information CI2 with the controller 110.

At operation 1806, the controllers can jointly schedule the routing and processing resource for each data traffic flow. For example, the controller 110 may select one from among a set of data transmission paths as a candidate data transmission path for the data traffic flow DTF1 according to the overall traffic demand, the traffic load information on the satellite constellation 10A, and the traffic load information on the satellite constellation 10B.

At operation 1808, the controllers can notify each satellite of the scheduling and routing decisions. For example, the controller 110/120 can notify each satellite in the selected data transmission path of the scheduling information SCH, which can indicate that the satellite in the selected data transmission path is used for the data traffic flow DTF1.

At operation 1810, the controllers can keep track of the satellite movement and the traffic demand variation, and accordingly update the corresponding control information. For example, the satellite tracking module 954 may keep track of the satellite movement of the satellite constellation 10A/10B. The controller 110/120 may keep monitoring a traffic demand of each data traffic flow. The control information CI1/CI2 can be continuously updated. Next, the flow may return to operation 1804.

Figure 19:
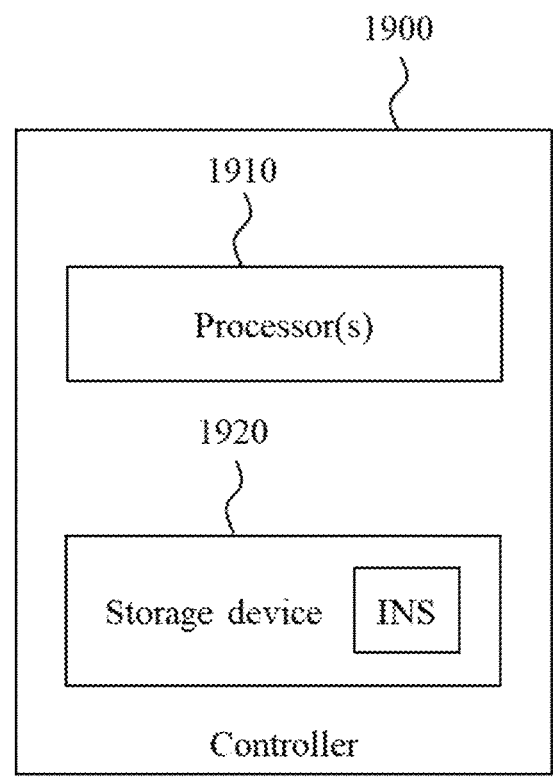
FIG. 19 is a block diagram illustrating an exemplary controller for operating a satellite communication system in accordance with some embodiments of the present disclosure.

FIG. 19 is a block diagram illustrating an exemplary controller for operating a satellite communication system in accordance with some embodiments of the present disclosure. The controller 1900 can serve as an embodiment of the controller 110/120 shown in FIG. 1A. The controller 1900 may be implemented using microcontroller(s), application specific integrated circuit(s), field programmable gate array(s), programmable logic device(s) or other types of controllers.

The controller 1900 includes, but is not limited to, one or more processors 1910 and a storage device 1920. The one or more processors 1910 may be implemented using central processing unit(s), graphic processing unit(s), general purpose processor(s), digital signal processor(s), microprocessor(s) or other types of processors. The storage device 1920 may include any non-transitory computer readable medium capable of storing data, instructions, software programs, or combinations thereof. For example, the storage device 1920 may be implemented by a memory device including a read-only memory (ROM), a random access memory (RAM), a flash memory, a content addressable memory (CAM), a disk memory, a memory card or any other types of memory devices suitable for storing information. In the present embodiment, the storage device 1920 may store instructions INS. When executed by the one or more processors 1910, the instructions INS can cause the one or more processors 1910 to perform data communication via an interconnected constellation.

Consider an example in which the controller 110 shown in FIG. 1A is implemented using the controller 1900. Referring to FIG. 19 and also to FIG. 1A, the one or more processors 1910 may obtain the control information CI1 on the satellite constellation 10A, and establish the communication link CL between the controller 110 and the controller 120. In addition, the one or more processors 1910 may receive the control information CI2 on the satellite constellation 10B from the controller 120 via the communication link CL, and perform data communication according to the control information CI1 and the control information CI2. As those skilled in the art would appreciate the operation of the controller 1900 after reading the above paragraphs directed to FIG. 1A to FIG. 18, further description is omitted for brevity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for operating a satellite communication system, comprising:
   interconnecting a first controller of a first satellite constellation and a second controller of a second satellite constellation in the satellite communication system to form an interconnected constellation, wherein the second satellite constellation is different from the first satellite constellation, and the interconnected constellation comprises the first satellite constellation and the second satellite constellation;
   utilizing the first controller to obtain first control information on the first satellite constellation, and receive second control information on the second satellite constellation from the second controller, wherein the first control information indicates a link quality of a first communication link between a user terminal and a first satellite of the first satellite constellation, and the second control information indicates a link quality of a second communication link between the user terminal and a second satellite of the second satellite constellation; and
   performing data communication via the interconnected constellation without using an intersatellite link, according to the first control information and the second control information, comprising:
      when the link quality of the second communication link is higher than the link quality of the first communication link, utilizing the first controller to select the second satellite as a candidate satellite for data transmission between the user terminal and a gateway.

2. The method of claim 1, wherein the first satellite constellation utilizes a first medium access control protocol for satellite communication, and the second satellite constellation utilizes a second medium access control protocol different from the first medium access control protocol for satellite communication.

3. The method of claim 1, wherein the step of performing data communication via the interconnected constellation according to the first control information and the second control information further comprises:
   when the link quality of the first communication link is higher than the link quality of the second communication link, utilizing the first controller to select the first satellite as the candidate satellite for data transmission between the user terminal and the gateway.

4. The method of claim 1, wherein the step of utilizing the first controller to obtain the first control information on the first satellite constellation comprises:
   establishing the first communication link between the user terminal and the first satellite of the first satellite constellation; and
   evaluating the link quality of the first communication link according to a location of the first satellite.

5. The method of claim 4, wherein the link quality of the second communication link is determined according to a location of the second satellite; when the first satellite is located closer to the user terminal than the second satellite, the link quality of the first communication link is higher than the link quality of the second communication link; when the second satellite is closer to the user terminal than the first satellite, the link quality of the second communication link is higher than the link quality of the first communication link.

6. The method of claim 1, further comprising:
   sending scheduling information to the user terminal, wherein the scheduling information indicates that the selected satellite is the candidate satellite.

7. The method of claim 1, wherein when the link quality of the second communication link is higher than the link quality of the first communication link and a capacity of the second satellite is higher than a capacity of the first satellite, utilizing the first controller to select the second satellite as the candidate satellite for data transmission between the user terminal and the gateway,
   wherein a capacity of the selected satellite is sufficient for the data transmission between the user terminal and the gateway.

8. A method for operating a satellite communication system, comprising:
   interconnecting a first controller of a first satellite constellation and a second controller of a second satellite constellation in the satellite communication system to form an interconnected constellation, wherein the second satellite constellation is different from the first satellite constellation, and the interconnected constellation comprises the first satellite constellation and the second satellite constellation;
   utilizing the first controller to obtain first control information on the first satellite constellation, and receive second control information on the second satellite constellation from the second controller, wherein the first control information indicates a location of each satellite of the first satellite constellation, and the second control information indicates a location of each satellite of the second satellite constellation; and
   performing data communication via the interconnected constellation according to the first control information and the second control information, comprising:
      selecting, according to the location of each satellite of the first satellite constellation and the location of each satellite of the second satellite constellation, one from among a set of gateways as a candidate gateway, wherein the candidate gateway is for connecting a user terminal to a communication network thorough a first satellite of the first satellite constellation and a second satellite of the second satellite constellation.

9. The method of claim 8, wherein a number of satellites in a data transmission path between the user terminal and the selected gateway is less than a number of satellites in a data transmission path between the user terminal and each unselected gateway.

10. The method of claim 8, further comprising:
    sending scheduling information to the user terminal, wherein the scheduling information indicates that the selected gateway is the candidate gateway.

11. A method for operating a satellite communication system, comprising:
    interconnecting a first controller of a first satellite constellation and a second controller of a second satellite constellation in the satellite communication system to form an interconnected constellation, wherein the second satellite constellation is different from the first satellite constellation, and the interconnected constellation comprises the first satellite constellation and the second satellite constellation;

utilizing the first controller to obtain first control information on the first satellite constellation, and receive second control information on the second satellite constellation from the second controller, wherein the first control information indicates a traffic load of each satellite of the first satellite constellation, and the second control information indicates a traffic load of each satellite of the second satellite constellation; and performing data communication via the interconnected constellation according to the first control information and the second control information, comprising:

obtaining a traffic demand of a data traffic flow from a source terrestrial terminal to a destination terrestrial terminal; and selecting one from among a set of data transmission paths as a candidate data transmission path for the data traffic flow according to the traffic demand, the traffic load of each satellite of the first satellite constellation, and the traffic load of each satellite of the second satellite constellation.

12. The method of claim 11, wherein satellite utilization of the interconnected constellation obtained when the selected data transmission path is used as the candidate data transmission path is higher than satellite utilization of the interconnected constellation obtained when an unselected data transmission path is used as the candidate data transmission path.

13. The method of claim 11, wherein the selected data transmission path comprises at least one satellite of the first satellite constellation and at least one satellite of the second satellite constellation.

14. The method of claim 11, further comprising:

notifying each satellite in the selected data transmission path of scheduling information, wherein the scheduling information indicates that the satellite in the selected data transmission path is used for the data traffic flow.

15. The method of claim 11, wherein the first controller is located in a first gateway connected to the first satellite constellation, and the second controller is located in a second gateway connected to the second satellite constellation; the first gateway and the second gateway are separated from each other.

16. The method of claim 11, wherein each of the first controller and the second controller is located in a gateway shared by the first satellite constellation and the second satellite constellation.

17. The method of claim 11, wherein the first controller is located in a satellite of the first satellite constellation, and the second controller is located in a satellite of the second satellite constellation.

\* \* \* \* \*